(12) United States Patent
Ohki et al.

(10) Patent No.: US 8,749,661 B2
(45) Date of Patent: Jun. 10, 2014

(54) IMAGING COMPOSITIONS OF MULTIPLE IMAGES HAVING DIFFERENT IMAGE RANGES

(71) Applicants: Mitsuharu Ohki, Tokyo (JP); Shinichiro Gomi, Tokyo (JP); Tomonori Masuno, Tokyo (JP); Masaru Suzuki, Tokyo (JP); Yusuke Nakamura, Tokyo (JP)

(72) Inventors: Mitsuharu Ohki, Tokyo (JP); Shinichiro Gomi, Tokyo (JP); Tomonori Masuno, Tokyo (JP); Masaru Suzuki, Tokyo (JP); Yusuke Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/886,141

(22) Filed: May 2, 2013

(65) Prior Publication Data

US 2013/0242141 A1    Sep. 19, 2013

Related U.S. Application Data

(63) Continuation of application No. 12/740,443, filed on Apr. 29, 2010.

(30) Foreign Application Priority Data

Sep. 8, 2008  (JP) .................................. 2008-229308
Jul. 9, 2009  (JP) .................................. 2009-162415

(51) Int. Cl.
*H04N 5/228*  (2006.01)
*G06K 9/68*  (2006.01)

(52) U.S. Cl.
USPC ...................................... 348/222.1; 382/218

(58) Field of Classification Search
None
See application file for complete search history.

(56) References Cited

U.S. PATENT DOCUMENTS 8,040,436 B2 * 10/2011 Park et al. ..................... 348/556
(Continued)

FOREIGN PATENT DOCUMENTS

JP       2001-211351         8/2001
(Continued)

OTHER PUBLICATIONS

International Search Report dated Nov. 24, 2009, in PCT/JP2009/065625.

(Continued)

*Primary Examiner* — Lin Ye
*Assistant Examiner* — John H Morehead, III
(74) *Attorney, Agent, or Firm* — Finnegan, Henderson, Farabow, Garrett & Dunner, LLP

(57) ABSTRACT

The present invention relates to an imaging apparatus and method and program whereby composition can more readily be confirmed.
An imaging unit 432 receives light from a lens 431 and images an imaging image; an extracting unit 435 extracts an extracted image which is an image having a different size from the imaging image and which includes a subject having a high degree of focus; a synthesizing unit 436 synthesizes the extracted image so that the positions of the subject match to the imaging image; and a display unit 438 displays the imaging image of the portions corresponding to a predetermined region having the same size as the extracted image in the display region wherein the entire imaging image can be displayed, and displays the extracted image that has been synthesized with the imaging image. The present invention can be applied to a digital camera, for example.

17 Claims, 32 Drawing Sheets

(56) References Cited

U.S. PATENT DOCUMENTS

| | | | |
|---|---|---|---|
| 2001/0012072 A1 | 8/2001 | Ueno | |
| 2005/0248681 A1* | 11/2005 | Nozaki et al. | 348/345 |
| 2006/0175549 A1* | 8/2006 | Miller et al. | 250/334 |
| 2008/0129845 A1* | 6/2008 | Azuma | 348/241 |
| 2009/0135269 A1* | 5/2009 | Nozaki et al. | 348/222.1 |
| 2010/0026839 A1* | 2/2010 | Border et al. | 348/231.2 |
| 2012/0075489 A1* | 3/2012 | Nishihara | 348/222.1 |

FOREIGN PATENT DOCUMENTS

| | | |
|---|---|---|
| JP | 2003-143444 | 5/2003 |
| JP | 2005-303694 | 10/2005 |
| JP | 2005-323015 | 11/2005 |
| JP | 2007-60721 | 3/2007 |
| JP | 2007-228224 | 9/2007 |
| JP | 2008-17166 | 1/2008 |
| JP | 2008-035480 | 2/2008 |

OTHER PUBLICATIONS

Notification of the Fourth Office Action issued Jul. 30, 2013 by the State Intellectual Property Office of People's Republic of China in corresponding China Patent Application No. 200980100878.X (8 pages).

English-language translation of Notification of the Fourth Office Action issued Jul. 30, 2013 by the State Intellectual Property Office of People's Republic of China in corresponding China Patent Application No. 200980100878.X (5 pages).

Office Action issued Dec. 17, 2013 by Japan Patent Office in corresponding Application No. JP 2010-089349 (5 pages).

* cited by examiner

IMAGING COMPOSITIONS OF MULTIPLE IMAGES HAVING DIFFERENT IMAGE RANGES

This application is a continuation of U.S. application Ser. No. 12/740,443, filed Apr. 29, 2010 and entitled "Imaging Apparatus and Method, and Program."

TECHNICAL FIELD

The present invention relates to an imaging apparatus and method and program, and in particular relates to an imaging apparatus and method and program whereby a composition can be confirmed more simply.

BACKGROUND ART

In general, there may be two imaging systems in an imaging apparatus such as a digital camera or the like.

For example, an imaging apparatus having a forward camera that images forward of the user and a backward camera that images behind the user has been proposed (e.g., see Patent Literature 1).

However, with the above-described imaging apparatus, the user cannot image one subject simultaneously with two imaging systems.

Also, with a general digital camera, switching between a standard mode and wide-angle mode can be performed with one imaging system, but the user cannot simultaneously confirm the composition in each mode.

Further, a camera has been proposed that has two display units which each display an image that has been imaged by the respective imaging systems. However, since there are two display units, the user has to confirm the composition for each image.

CITATION LIST

Patent Literature

PTL 1: Japanese Unexamined Patent Application Publication No. 2007-60721

SUMMARY OF INVENTION

Technical Problem

As described above, confirming the compositions of two images having different image ranges in a simple manner has not been easy.

The present invention has been made in light of the above, and enables confirming compositions in a more simple manner.

Solution to Problem

The imaging apparatus according to one aspect of the present invention includes synthesizing means to synthesize a first image that is an imaged subject, and a second image having a different range of imaging from the first image, so as to match the positions of the subject; and display means to display the first image and the second image that have been synthesized by the synthesizing means.

The imaging apparatus may further include imaging means to receive light from an optical system and image the first image of the subject; and extracting means to extract a second image which is an image having a different size from the first image and which includes the subject having a high degree for focus, from the first image; wherein the synthesizing means may synthesize the second image that is extracted by the extracting means so that the position of the subject matches to the first image, and wherein the display means may display the first image of a corresponding portion to a predetermined region having the same size as the second image in a display region that can display the first image in its entirety, and may display the second image that has been synthesized with the first image.

The display means may enhance and display the second image in the display region.

The display region may be a region wherein the first image is displayed in its entirety when the imaging mode is a standard mode that images an image having an aspect ratio of 4:3, and wherein the predetermined region in the display region is a region wherein a portion of the first image is displayed when the imaging mode is a panorama mode that images an image having an aspect ratio of 16:9.

The imaging apparatus may further include cropping means to crop out the first image of the predetermined region; and recording means to record the first image that has been cropped out by the cropping means and the second image that has been extracted by the extracting means.

The synthesizing means may synthesize the first image that has been cropped out by the cropping means and the second image that has been extracted by the extracting means, and the recording means may record the first image and the second image that have been synthesized by the synthesizing means.

The imaging apparatus may further include first imaging means to receive light from a first optical system and image the first image of the subject; second imaging means to receive light from a second optical system and image a second image that has a different view angle from the first image of the subject; and a first image quality adjusting means to adjust the image quality of the second image so as to differ from the image quality of the first image; wherein the synthesizing means synthesizes the first image as to the second image so that the positions of the subject match with the second image of which the image quality has been adjusted by the first image quality adjusting means.

The imaging apparatus may further include object detecting means to detect an object within the second image; and second image quality adjusting means to adjust the image quality of a region of the object within the second image that has been detected by the object detecting means so as to differ from the image quality of the second image, wherein the synthesizing means synthesizes the first image and the object image in the region of the object within the second image of which the image quality has been adjusted by the second image quality adjusting means, so that the positions of the subject match, to the second image.

The object detecting means may detect the object having motion within the second image.

The object detecting means may detect the face of a person within the second image.

The imaging apparatus may further include composition analyzing means to analyze the composition of the second image; and composition extracting means to extract the composition of a view angle different from the view angle of the first image, from the second image, based on the composition analyzed by the composition analysis means; wherein the synthesizing means synthesizes the first image and the extracted image of the composition extracted by the composition extracting means, so that the positions of the subject match, to the second image.

The second imaging means may receive light from the second optical system to image the second imaging having a wider view angle of the subject than the first image.

The imaging apparatus may further include distortion correcting means to correct the distortion of the second image and optical axis correcting means to match the optical axis of the second optical system to the optical axis of the first optical system, and determine the position of the first image synthesized to the second image.

The first image quality adjusting means may adjust the level of the color signal of the second image so as to be lower than the level of the color signal of the first image.

The imaging apparatus may be further provided with second image quality adjusting means to adjust the image quality of the first image so as to differ from the image quality of the second image.

The second image quality adjusting means may adjust the level of color signals of the first image so as to be greater than the level of the color signals of the second image.

An imaging method according to one aspect of the present invention includes: a synthesizing step to synthesize a first image that is an imaged subject and a second image having a different range of imaging from the first image; and a displaying step to display the first image and the second image that have been synthesized by the processing of the synthesizing step.

A program according to one aspect of the present invention causes a computer to execute processing including: a synthesizing step a first image that is an imaged subject and a second image having a different range of imaging from the first image; and a displaying step of the first image and the second image that have been synthesized by the processing of the synthesizing step.

According to an aspect of the present invention, a first image that is an imaged subject and a second image having a different imaging range from the first image are synthesized, and the synthesized first image and second image are displayed.

Advantageous Effects of Invention

According to an aspect of the present invention, composition can be more readily confirmed.

DESCRIPTION OF EMBODIMENTS

The embodiments of the present invention will be described below with reference to the diagrams. Note that description will be given in the following order.
1. First Embodiment
2. Second Embodiment
3. Third Embodiment
4. Fourth Embodiment
1. First Embodiment
[External View of Imaging Apparatus and Imaging Image]

Figure 1:
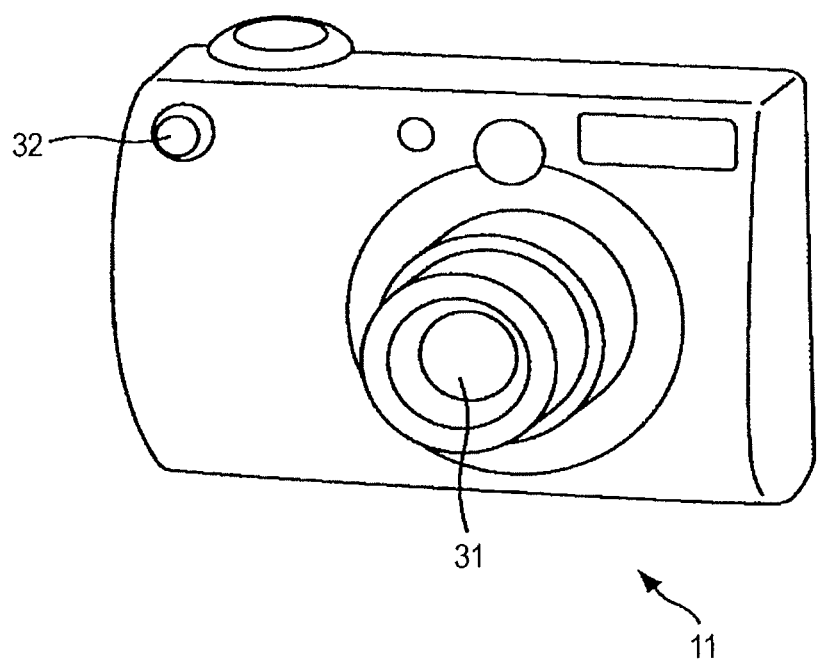
FIG. 1 is a diagram showing an example of an external view of a digital camera as an embodiment of the imaging apparatus to which the present invention is applied.

FIG. 1 shows an example of an external view of a digital camera serving as an embodiment of the imaging apparatus to which the present invention is applied.

The digital camera 11 in FIG. 1 has the two optical systems of a main lens 31 and sub-lens 32. The main lens 31 is a so-called standard lens. The sub-lens 32 is a wide-angle lens (i.e. fish-eye lens or the like), and the view angle thereof is sufficiently wide when compared to the main lens 31.

Figure 2:
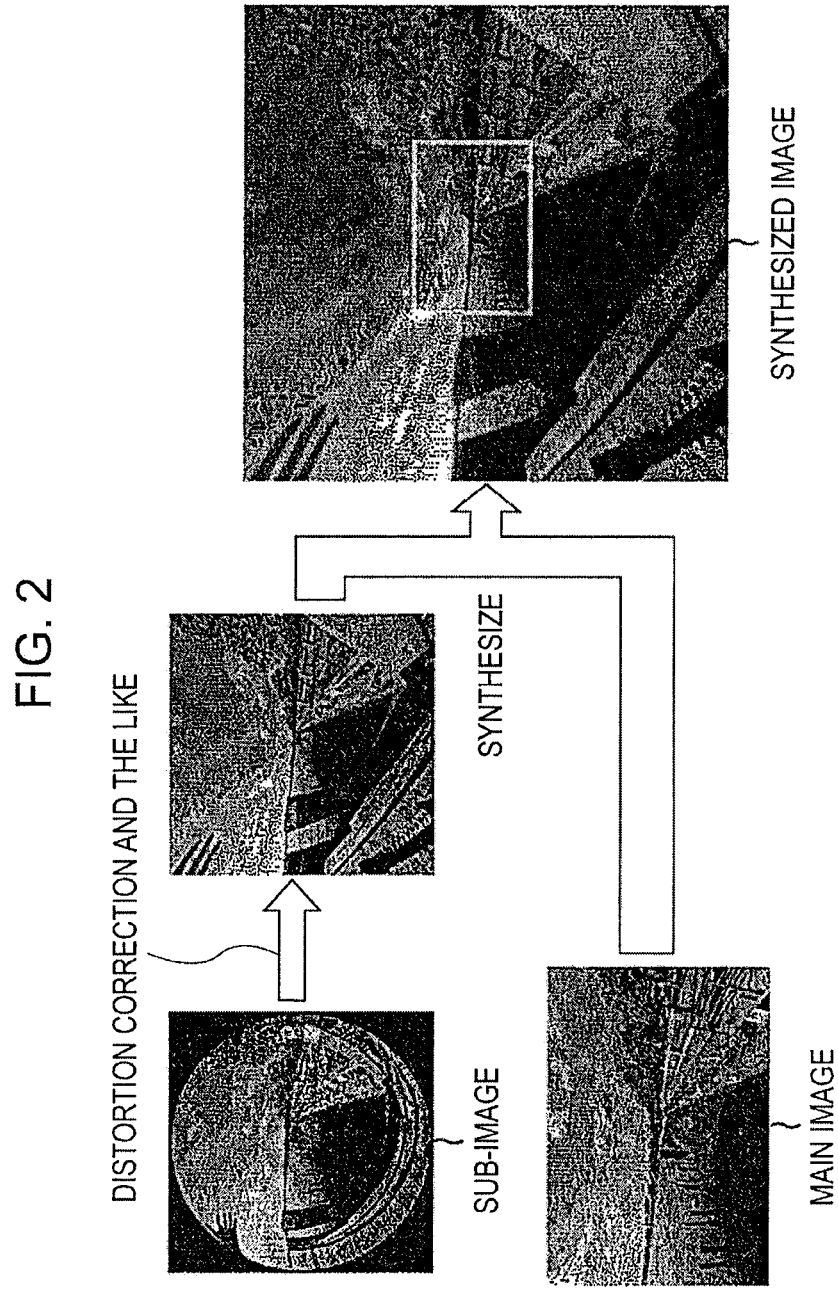
FIG. 2 is a diagram showing a display example of an imaging image that a digital camera images.

FIG. 2 shows a display example of an imaging image that the digital camera 11 images.

As shown in FIG. 2, the digital camera 11 performs correcting processing such as distortion correcting as to an image (sub-image) that is imaged via the sub-lens 32, and performs predetermined image processing (such as blurring the image or decreasing brightness and color saturation). Also, the digital camera 11 performs predetermined image processing (such as increasing brightness and color saturation) as to an image (main image) that is imaged via the main lens 31. The digital camera 11 adjusts the positions and view angles of the main image and sub-image, and displays the image (synthesized image) wherein the main image and sub-image have been synthesized on an unshown display unit provided on the back face of the digital camera 11, for example as shown in FIG. 2. The user can confirm the view angle for imaging by confirming the display content on the unshown display unit.

The synthesized image shown in FIG. 2 is synthesized so that the positions of the subject in each image match of the sub-image (wide angle image) subjected to predetermined correcting and image processing and the main image (standard image).

[Functional Configuration Example of the Digital Camera]

Next, a functional configuration example of the digital camera 11 will be described with reference to the block diagram in FIG. 3.

Figure 3:
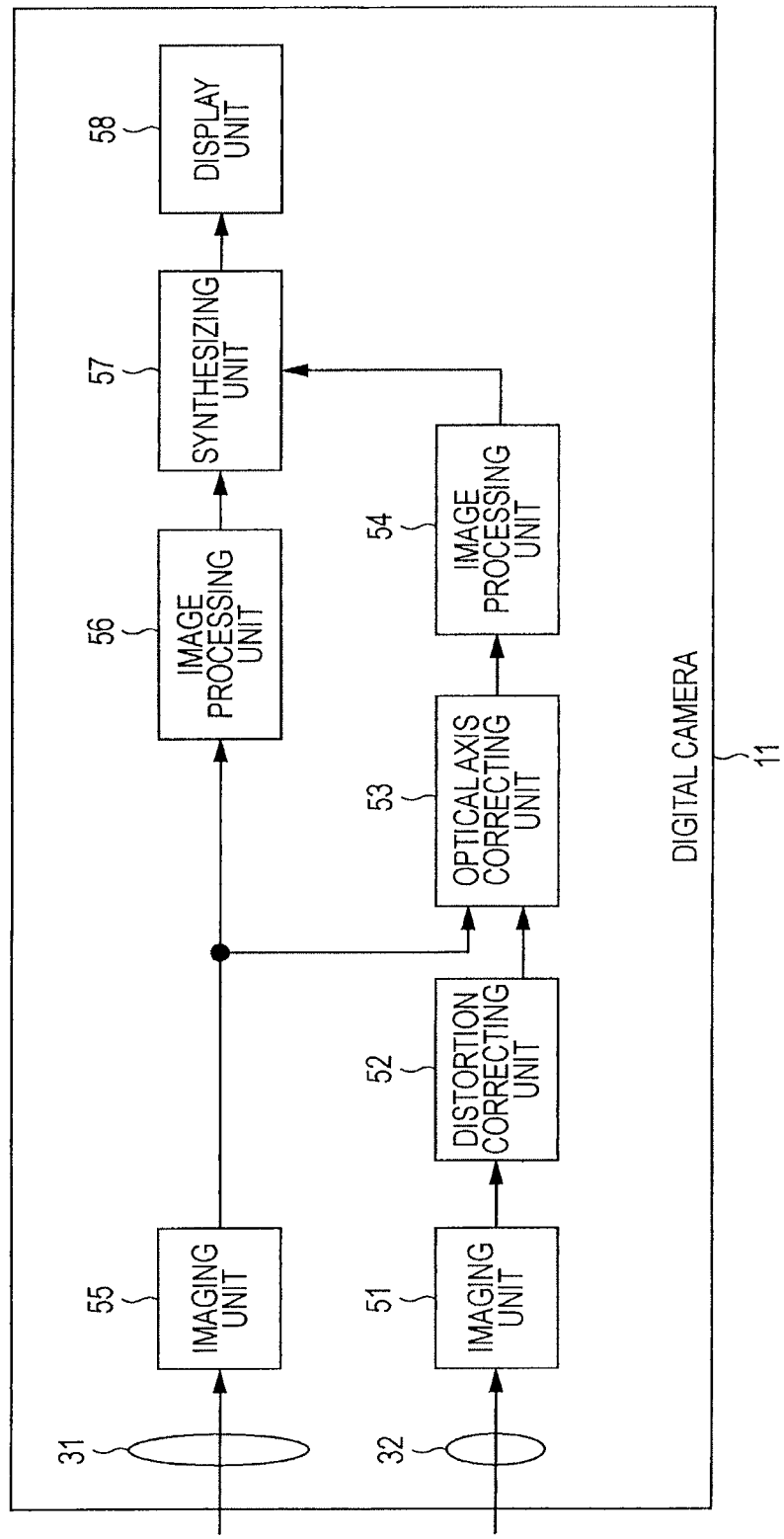
FIG. 3 is a block diagram showing a functional configuration example of a digital camera.

The digital camera 11 in FIG. 3 is made up of a main lens 31, sub-lens 32, imaging unit 51, distortion correcting unit 52, optical axis correcting unit 53, image processing unit 54, imaging unit 55, image processing unit 56, synthesizing unit 57, and display unit 58.

The main lens 31 and sub-lens 32 are the same as that described with reference to FIG. 1, so description thereof will be omitted.

The imaging unit 51 is configured including an imaging device and A/D (Analog/Digital) converter. The imaging unit 51 images a subject by receiving light from the sub-lens 32 and performing photoelectric conversion, and subjects the obtained analog image signal to A/D conversion. The imaging unit 51 supplies the digital image data (wide angle image) obtained as a result of the A/D conversion to the distortion correcting unit 52.

The distortion correcting unit 52 corrects the distortion of the sub-lens 32 of the wide angle image (sub-image) from the imaging unit 51, and supplies the corrected sub-image to the optical axis correcting unit 53.

The optical axis correcting unit 53 matches the optical axis of the sub-lens 32 to the optical axis of the main lens 31, determines the position of the main image that is to be synthesized to the sub-image in the sub-image from the distortion correcting unit 52, and supplies the position information showing the position thereof, along with the sub-image, to the image processing unit 54.

The image processing unit 54 subjects the sub-image from the optical axis correcting unit 53 to predetermined image processing (adjustments such as picture, brightness, color density, color shade, sharpness) so as to reduce the image quality more than the main image, and supplies this to the synthesizing unit 57 along with the position information.

A configuration example of three types of image processing units 54 will be described with reference to the block diagrams in FIG. 4 through FIG. 6.

Figure 4:
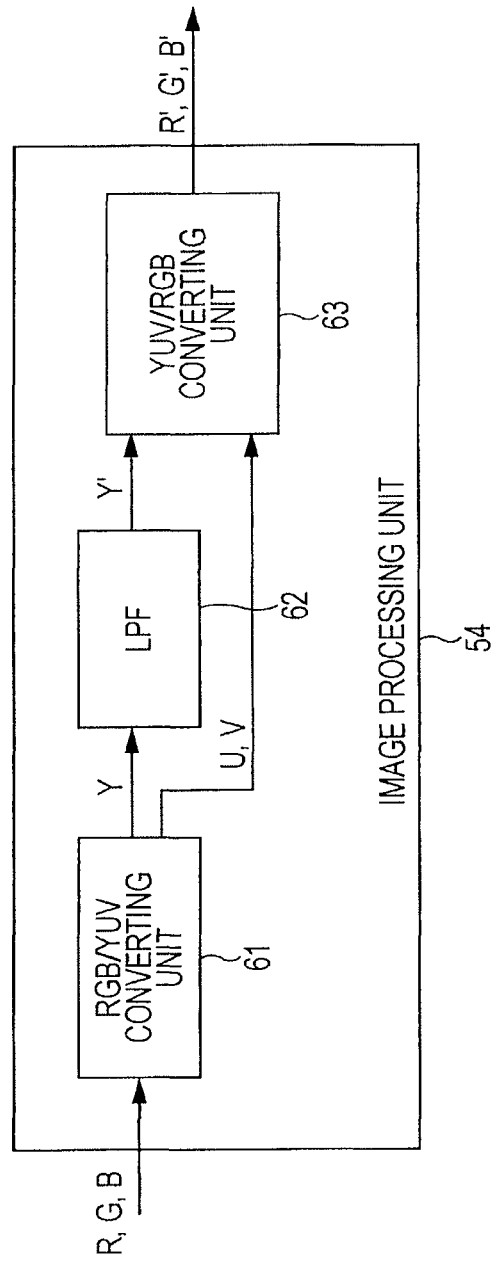
FIG. 4 is a block diagram showing a configuration example of an image processing unit.

FIG. 4 is a first configuration example, and shows a configuration example of the image processing unit 54 whereby the sub-image is subjected to blurring processing.

The image processing unit 54 in FIG. 4 is configured from a RGB/YUV converter 61, LPF (Low Pass filter) 62, and YUV/RGB converter 63.

The RGB/YUV converter 61 converts the RGB signal serving as a sub-image supplied from the optical axis correcting unit 53 to a YUV signal based on the Expression (1) below.

[Mathematical Expression 1]

$$Y=0.299R+0.587G+0.114B$$

$$U=-0.169R-0.331G-0.500B \quad (1)$$

$$V=0.500R-0.419G-0.081B$$

The RGB/YUV converter 61 supplies the Y signal (brightness signal) of the converted YUV signals to the LPF 62, while supplying the U and V signals (color difference signals) to the YUV/RGB converter 63.

The LPF 62 subjects the Y signal supplied from the RGB/YUV converter 61 to smoothing processing, whereby high-frequency components are removed, and supplied to the YUV/RGB converter 63.

The YUV/RGB converter 63 converts the Y signal from the LPF 62 (Y') and the U and V signals from the RGB/YUV converter 61 to an RGB signal based on the Expression (2) below.

[Mathematical Expression 2]

$$R=1.000Y+1.402V$$

$$G=1.000Y-0.344U-0.714V \quad (2)$$

$$B=1.000Y+1.772U$$

The YUV/RGB converter 63 supplies the converted RGB signal (R', G', B') to the synthesizing unit 57 as a sub-image.

With the configuration as above, the image processing unit 54 can subject the sub-image to blurring processing.

Figure 5:
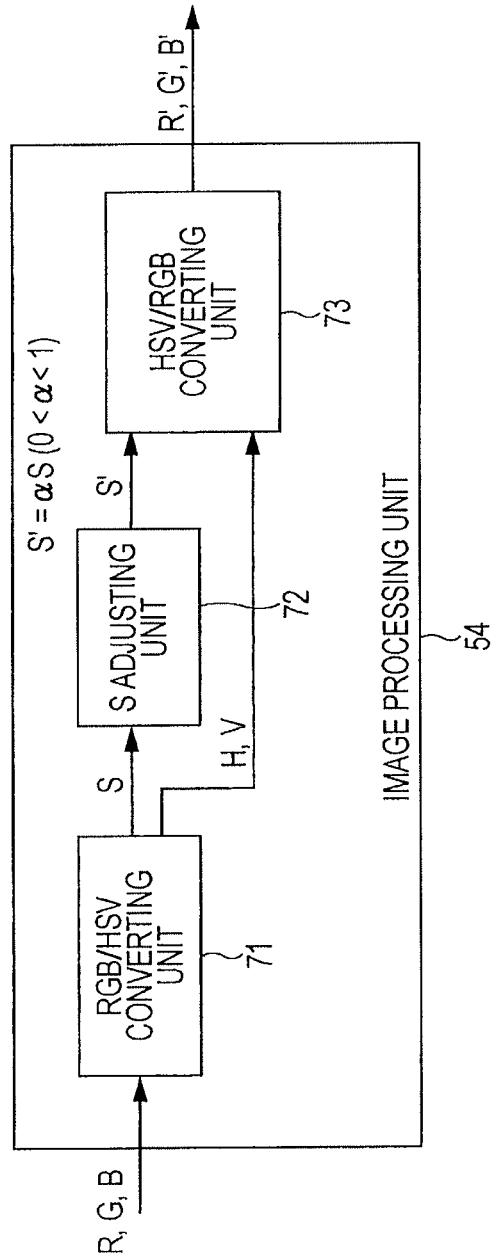
FIG. 5 is a block diagram showing a configuration example of an image processing unit.

FIG. 5 is a second configuration example, and shows a configuration example of the image processing unit 54 to reduce the color saturation of the sub-image.

The image processing unit 54 in FIG. 5 is made up of an RGB/HSV converter 71, color saturation adjusting unit (S-adjusting unit) 72, and HSV/RGB converter 73.

The RGB/HSV converter 71 converts the RGB signal serving as the sub-image supplied from the optical axis correcting unit 53 to an HSV signal based on the Expression (3) below.

[Mathematical Expression 3]

$$H = \begin{cases} 60 \times \frac{G-B}{MAX-MIN} + 0, & \text{if } MAX = R \\ 60 \times \frac{B-R}{MAX-MIN} + 120, & \text{if } MAX = G \\ 60 \times \frac{R-G}{MAX-MIN} + 240, & \text{if } MAX = B \end{cases} \quad (3)$$

$$S = \frac{MAX-MIN}{MAX}$$

$$V = MAX$$

In Expression (3), MAX represents the maximum value of R, G, B and MIN represents the minimum value of R, G, B, respectively. The RGB/HSV converter 71 supplies the S signal (color saturation signal) of the converted HSV signal to the S-adjusting unit 72, while supplying the H signal (hue signal) and V signal (lightness value signal) to the HSV/RGB converter unit 73.

The S-adjusting unit 72 multiplies the S signal supplied from the RGB/HSV converter 71 by a predetermined coefficient α (0<α<1), and supplies this to the HSV/RGB converter 73.

The HSV/RGB converter 73 converts the S signal (S'=αS) from the S-adjusting unit 72 the H and V signals from the RGB/HSV converter 71 to RGB signals.

That is to say, when Hi=[H/60] mod 6 ([x]: maximum integer at or less than x, A mod B: remainder of A/B), f=(H/60)−Hi, p=V(1−S), q=V(1−fS), t=V(1−(1−f)S), then the HSV signals are converted to RGB signals, based on the Expression (4) below.

[Mathematical Expression 4]

$$H_i=0 \Rightarrow R=V, G=t, B=p$$
$$H_i=1 \Rightarrow R=q, G=V, B=p$$
$$H_i=2 \Rightarrow R=p, G=V, B=t$$
$$H_i=3 \Rightarrow R=p, G=q, B=V \quad (4)$$
$$H_i=4 \Rightarrow R=t, G=p, B=V$$
$$H_i=5 \Rightarrow R=V, G=p, B=q$$

The HSV/RGB converter 73 supplies the converted RGB signals (R', G', B') to the synthesizing unit 57 as a sub-image.

With the above-described configuration, the image processing unit 54 can reduce the color saturation of the sub-image.

Figure 6:
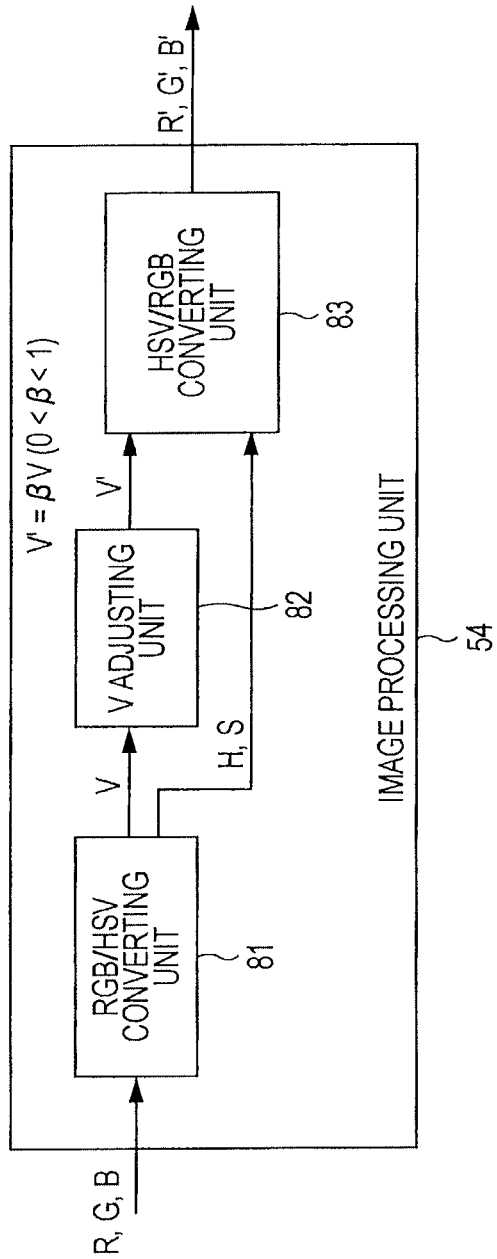
FIG. 6 is a block diagram showing a configuration example of an image processing unit.

FIG. 6 is a third configuration example, and shows a configuration example of the image processing unit 54 that reduces the lightness value of the sub-image.

The image processing unit 54 in FIG. 6 is made up of an RGB/HSV converter 81, lightness value adjusting unit (V-adjusting unit) 82, and HSV/RGB converter 83.

The RGB/HSV converter 81 converts the RGB signals serving as the sub-image supplied from the optical axis correcting unit 53 into HSV signals based on the above-described Expression (3), and supplies the V-signal of the converted HSV signals to the V-adjusting unit 82, while supplying the H-signal and S-signal to the HSV/RGB converter 83.

The V-adjusting unit 82 multiplies the V-signal supplied from the RGB/HSV converter 81 by a predetermined coefficient β (0<β<1), and supplies this to the HSV/RGB converter 83.

The HSV/RGB converter 83 converts the V-signal (V'=βV) from the V-adjusting unit 82 and the H- and S-signals from the RGB/HSV converter 81 to RGB signals based on the above-described expression (4), and supplies the converted RGB signals (R', G', B') to the synthesizing unit 57 as sub-images.

With the above-described configuration, the image processing unit 54 can reduce the lightness value of the sub-image.

Thus, the three types of image processing units 54 described with reference to FIG. 4 through FIG. 6 can reduce the image quality of the sub-image more than the image quality of the main image in any of these.

Returning to description of FIG. 3, the imaging unit 55 is configured so as to include an imaging device and A/D converter. The imaging unit 55 images the subject by receiving light from the main lens 31 and performing photoelectric conversion, and subjects the obtained analog image signal to A/D conversion. The imaging unit 55 supplies the digital image data (standard image) obtained as a result of the A/D conversion to the image processing unit 56.

The image processing unit 56 subjects the main image (standard image) from the imaging unit 55 to predetermined image processing (adjustments such as picture, brightness, color density, color shade, sharpness) so as to increase the image quality more than the sub-image, and supplies this to the synthesizing unit 57.

Now, configuration examples for three types of image processing units 56 will be described with reference to the block diagrams in FIG. 7 through FIG. 9.

Figure 7:
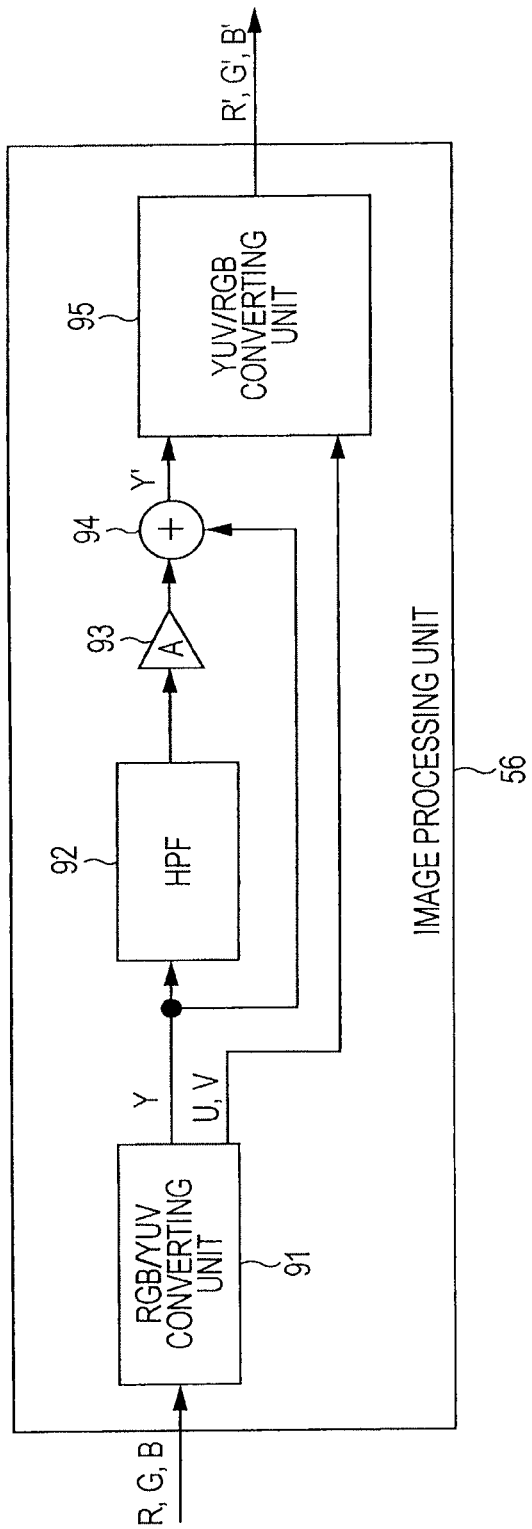
FIG. 7 is a block diagram showing a configuration example of an image processing unit.

FIG. 7 is a first configuration example, and shows a configuration example of the image processing unit 56 that performs enhancement processing to enhance the shape and outlines of the main images.

The image processing unit 56 of FIG. 7 is made up of a RGB/YUV converter 91, HPF (High Pass Filter) 92, amplifier 93, adding unit 94, and YUV/RGB converter 95.

The RGB/YUV converter 91 converts the RGB signals serving as the main image from the imaging unit 55 into YUV signals based on the above-described Expression (1), and supplies the Y-signal of the converted YUV signals to the HPF 92 and adding unit 94, while supplying the U- and V-signals to the YUV/RGB converter 95.

The HPF 92 takes out the high frequency components of the Y-signal supplied from the RGB/YUV converter 91, and supplies this to the amplifier 93. The amplifier 93 amplifies the high frequency components of the Y-signal from the HPF 92 by A (A>1) times, and supplies this to the adding unit 94. The adding unit 94 adds the high frequency components of the Y-signal amplified by the amplifier 93 to the Y-signal from the RGB/YUV converter 91, and supplies this to the YUV/RGB converter 95.

The YUV/RGB converter 95 converts the Y-signal (Y') from the adding unit 94 and the U- and V-signals from the RGB/YUV converter 91 into RGB signals, based on the above-described Expression (2), and supplies the converted RGB signals (R', G', B') to the synthesizing unit 57 as a main image.

With the above configuration, the image processing unit 56 can subject the main image to enhancement processing.

Figure 8:
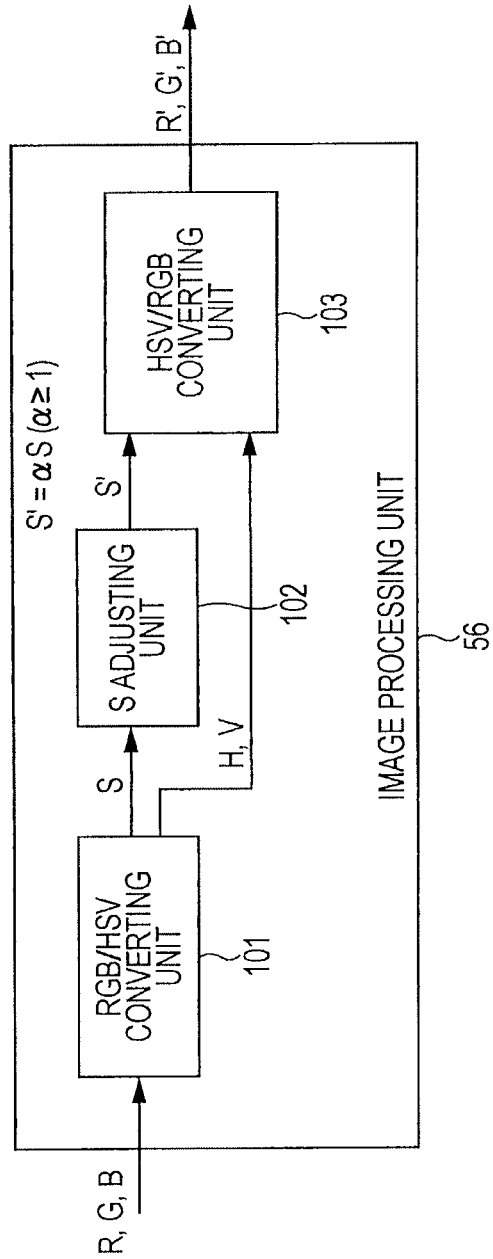
FIG. 8 is a block diagram showing a configuration example of an image processing unit.

FIG. 8 is a second configuration example, and shows a configuration example of the image processing unit 56 to increase the saturation of the main image.

The image processing unit 56 in FIG. 8 is made up of an RGB/HSV converter 101, saturation adjusting unit (S-adjusting unit) 102, and HSV/RGB converter 103. Note that the RGB/HSV converter 101 and HSV/RGB converter 103 have similar functions as the RGB/HSV converter 71 and HSV/RGB converter 73 provided to the image processing unit 54 in FIG. 5, so description thereof will be omitted.

That is to say, the S-adjusting unit 102 multiplies a predetermined coefficient α (α≥1) by the S-signal supplied from the RGB/HSV converter 101, and supplies this to the HSV/RGB converter 103.

With the above configuration, the image processing unit 56 can increase the saturation of the main image.

Figure 9:
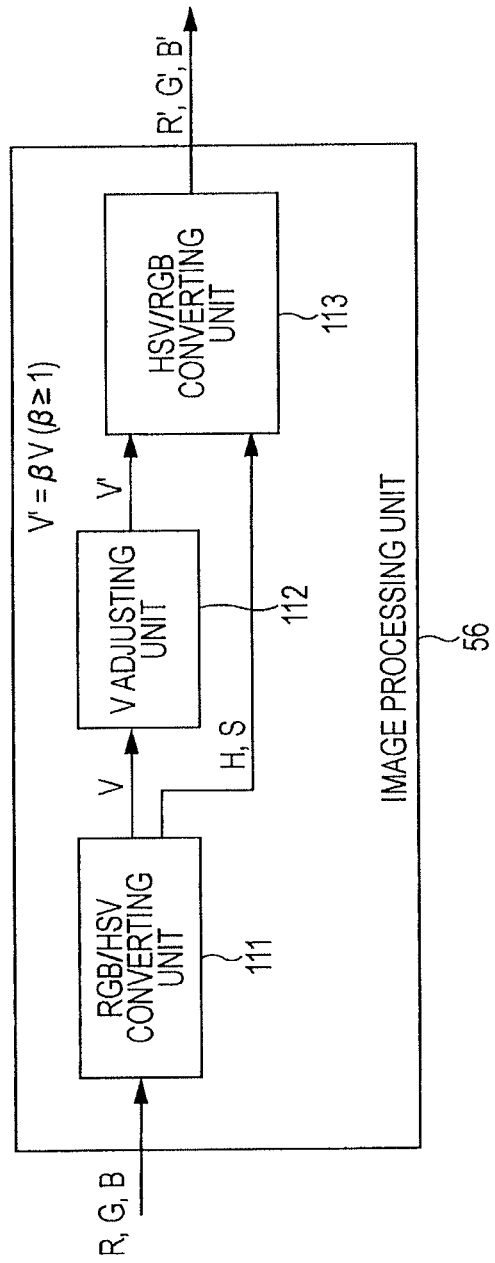
FIG. 9 is a block diagram showing a configuration example of an image processing unit.

FIG. 9 is a third configuration example, and shows a configuration example of the image processing unit 56 that increases the lightness value of the sub-image.

The image processing unit 56 in FIG. 9 is made up of a RGB/HSV converter 111, lightness value adjusting unit (V-adjusting unit) 112, and HSV/RGB converter 113. Note that the RGB/HSV converter 111 and HSV/RGB converter 113 have similar functions as the RGB/HSV converter 81 and HSV/RGB converter 83 provided to the image processing unit 54 in FIG. 6, so description thereof will be omitted.

That is to say, the V-adjusting unit 112 multiplies a predetermined coefficient β (β≥1) by the V-signal supplied from the RGB/HSV converter 111, and supplies this to the HSV/RGB converter 113.

With the above configuration, the image processing unit 56 can increase the lightness value of the main image.

Thus, any of the three types of image processing units 56 described with reference to FIG. 7 through FIG. 9 can have the image quality of the main image thereof increased more than the image quality of the sub-image.

Returning to the description in FIG. 3, the synthesizing unit 57 synthesizes the main image from the image processing unit 56 with the sub-image from the image processing unit 54, based on the position information from the image processing unit 54, and supplies the synthesized image that has been synthesized to the display unit 58.

The display unit 58 displays the synthesized image from the synthesizing unit 57.

[Image Display Processing of Digital Camera]

Next, the image display processing of the digital camera 11 in FIG. 3 will be described with reference to the flowchart in FIG. 10.

In step S11, the distortion correcting unit 52 corrects the distortion of the sub-lens 32 in the wide-angle image (sub-image) from the imaging unit 51, and supplies the corrected sub-image to the optical axis correcting unit 53.

The distortion correcting processing of the distortion correcting unit 52 will be described with reference to FIG. 11 and FIG. 12.

Figure 11:
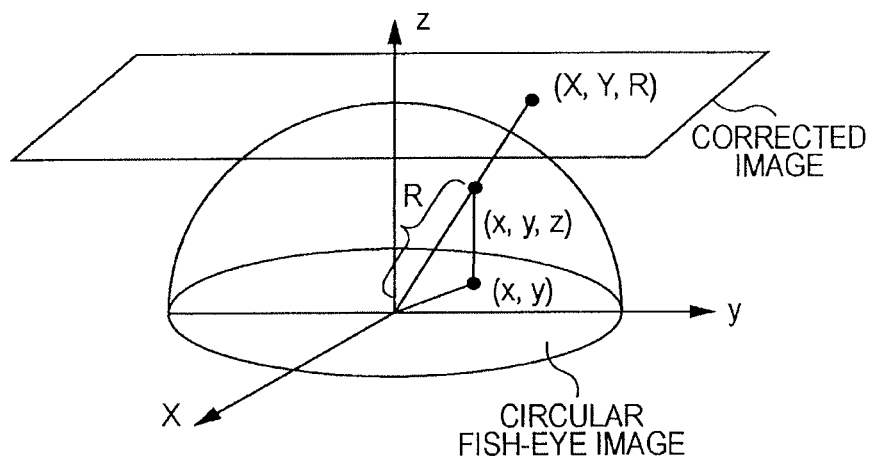
FIG. 11 is a diagram describing the distortion correcting processing of a distortion correcting unit.

FIG. 11 is a diagram describing the correlation of a pixel position (X, Y) of the pixel in the corrected image of a predetermined size that is obtained by distortion correcting and a pixel position (x, y) of a pixel in a sub-image (circular fish-eye image) before distortion correcting.

As shown in FIG. 11, we will consider an upper hemisphere having a radius R, along a cross-section taken on the diameter of a circular fish-eye image, with the center of the circular fish-eye image as the origin point of xyz coordinates. Note that the corrected image is in contact with the upper hemisphere at the point (0, 0, R).

In the case that the intersection between a straight line linking the origin point of the xyz coordinate and the point (X, Y, R) and the sphere face of the upper hemisphere is (x, y, z), and the distance between the origin point of the xyz coordinate and the intersection (x, y, z) is R, the Expression (5) below holds.

[Mathematical Expression 5]

$$x = \frac{z}{R}X = \frac{R}{\sqrt{X^2 + Y^2 + R^2}}X \quad (5)$$
$$y = \frac{z}{R}Y = \frac{R}{\sqrt{X^2 + Y^2 + R^2}}Y$$

That is to say, the distortion correcting unit 52 generates a corrected image by causing the pixel value of the point (X, Y) in the corrected image after correction to be the pixel value of the point (x, y) in the corresponding circular fish-eye image before correction.

Figure 12:
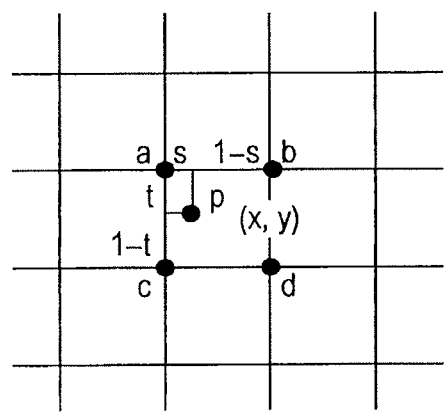
FIG. 12 is a diagram describing the distortion correcting processing of a distortion correcting unit.

Note that as shown in FIG. 12, in the case that the point (x, y) in the circular fish-eye image before correction, which corresponds to the point (X, Y) in the corrected image after correction, is not positioned at the grid point that the pixel is disposed, the periphery pixels (pixel values) a through d may be interpolated to be the pixel value at point (x, y). As a method of interpolation, a bilinear interpolation or bi-cubic interpolation or the like is used. In FIG. 12, in the case of using bilinear interpolation, the pixel value p at point (x, y) is found with p=(1−t){(1−s)a+sb}+t{(1−s)c+sd}.

Figure 10:
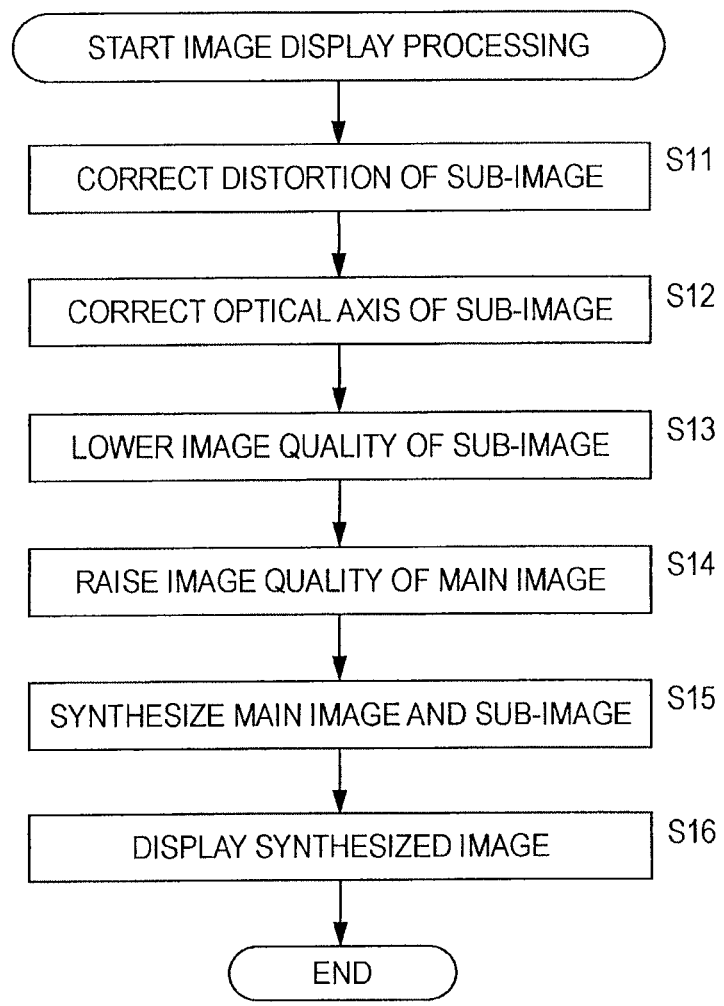
FIG. 10 is a flowchart describing the image display processing of the digital camera in FIG. 3.

Returning to the flowchart in FIG. 10, in step S12, the optical axis correcting unit 53 matches the optical axis of the sub-lens 32 to the optical axis of the main lens 31, and determines the position of the main image synthesized to the sub-image in the sub-image from the distortion correcting unit 52. The optical axis correcting unit 53 supplies the position information indicating the position thereof and the sub-image to the image processing unit 54.

Now, the optical axis correcting processing of the optical axis correcting unit 53 will be described with reference to FIG. 13.

Figure 13:
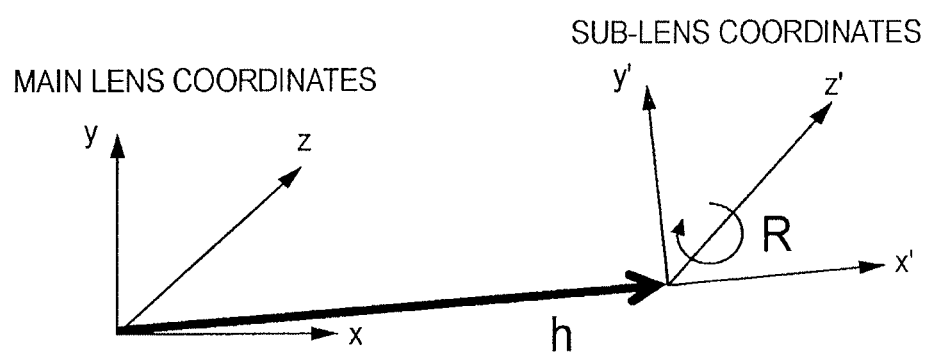
FIG. 13 is a diagram describing the optical axis correcting processing of the optical axis correcting unit.

FIG. 13 is a diagram describing the relation between the coordinate system of the optical axis of the main lens 31 (main lens coordinate system) and the coordinate system of the optical axis of the sub-lens 32 (sub-lens coordinate system).

In FIG. 13, a vector h shows the difference in physical disposal on an x-y plane between the main lens 31 and sub-lens 32 disposed on a digital camera 11, and a rotational amount R shows the rotational shifting amount wherein the z-axis of the main lens 31 optical axis and sub-lens 32 optical axis is a standard. That is to say, the vector v'=(x', y', z') in the sub-lens coordinate system uses the vector v=(x, y, z) in the main lens coordinate system, and is expressed with v'=Rv+h. That is to say, the vector v' in the sub-lens coordinate system is a vector wherein the vector v is rotated a rotational amount R and the vector h is moved in parallel. The optical axis correcting unit 53 uses the relation thereof, thereby matching the optical axis (coordinates) of the sub-lens 32 to the optical axis (coordinates) of the main lens 31.

Further, the optical axis correcting unit 53 performs matching between an image within a region near the center of the sub-image from the distortion correcting unit 52, and a main image from the imaging unit 55 corresponding to the region thereof, thereby determining the position of the main image synthesized to the sub-image.

Returning to the flowchart in FIG. 10, in step S13 the image processing unit 54 performs predetermined image processing as to the sub-image from the optical axis correcting unit 53, so as to lower the image quality more than the main image. More specifically, the image processing unit 54 lowers the brightness, saturation, or lightness value of the sub-image. The image processing unit 54 supplies the sub-image with reduced image quality to the synthesizing unit 57 along with the position information from the optical axis correcting unit 53. Now, the image processing unit 54 extracts only the brightness signal of the sub-image, and supplies a monochrome image to the synthesizing unit 57.

In step S14, the image processing unit 56 subjects the main image from the imaging unit 55 to predetermined image processing so as to increase the image quality above that of the sub-image. More specifically, the image processing unit 56 increases the brightness, saturation, or lightness value of the main image. The image processing unit 56 supplies the main image having increased image quality to the synthesizing unit 57. Now, the image processing unit 56 can also add frames with predetermined color and line types to the periphery of the main image, and supply this to the synthesizing unit 57.

In step S15, the synthesizing unit 57 synthesizes the main image from the image processing unit 56 and the sub-image from the image processing unit 54, based on position information from the image processing unit 54, and supplies the synthesized image that has been synthesized to the display unit 58.

At this time, the main image has to be of a size smaller than the sub-image, but this depends on the imaging device provided to the imaging unit 51 and imaging unit 55 respectively.

For example, in the case that the size of the imaging devices provided to the imaging unit 51 and imaging unit 55 respectively are the same, images of different ranges can be generated as images of the same size. Accordingly, in order to synthesize the main image and the sub-image, one or the other image size has to be adjusted.

Now, adjusting the size of the images of the main image and sub-image in the synthesizing processing of the synthesizing unit 57 will be described with reference to FIG. 14.

Figure 14:
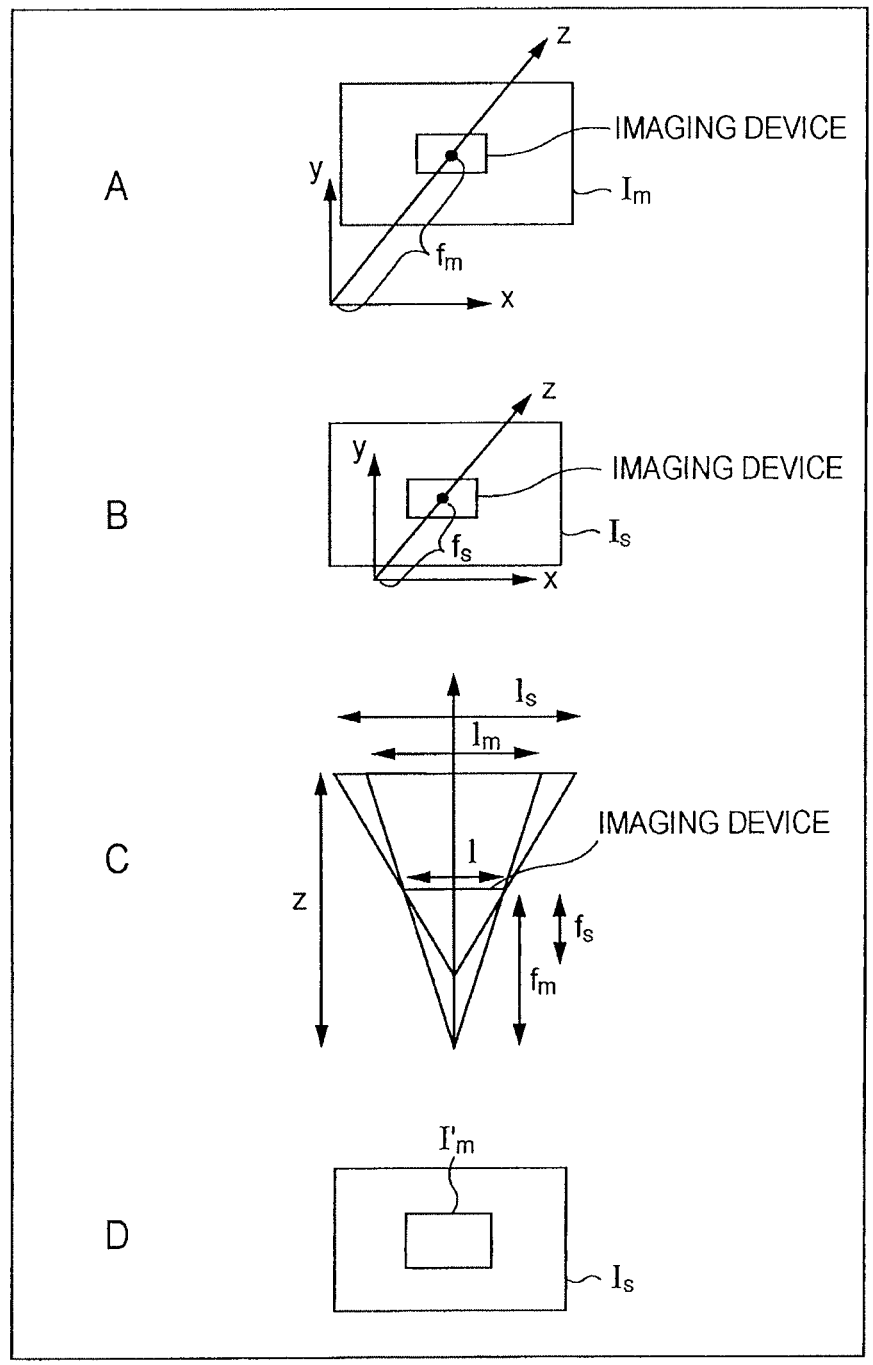
FIG. 14 is a diagram describing an adjustment in image size of the main image and sub-image of the synthesizing processing of a synthesizing unit.

As shown in A in FIG. 14, let us say that the distance (z-axis direction) between the origin point when the origin point of the xyz coordinate is the position of the main lens 31, and the imaging device of the imaging unit 55 for capturing the main image $I_m$ is $f_m$.

Also, as shown in B in FIG. 14, let us say that the distance (z-axis direction) between the origin point when the origin point of the xyz coordinate is the position of the sub-lens 32, and the imaging device of the imaging unit 51 for capturing the sub-image $I_s$ is $f_s$.

If we consider a certain subject distance Z, as shown in C in FIG. 14, let us say that the range reflected to the imaging device of the imaging unit 55 of the main image $I_m$ is $l_m$, and the range reflected to the imaging unit 51 of the sub-image $I_s$ is $l_s$. Also, let us say that the size of the imaging devices for each of the imaging unit 51 and imaging unit 55 is l.

At this time, from the relation in C in FIG. 14, the following Expression (6) is obtained.

[Mathematical Expression 6]

$$l_m = \frac{Z}{f_m} \cdot l$$
$$l_s = \frac{Z - f_m + f_s}{f_s} \cdot l \qquad (6)$$

Also, from the relation in Expression (6), the ratio $l_m/l_s$ of the size of the main image $I_m$ and the size of the sub-image $I_s$ is found with the Expression (7) below.

[Mathematical Expression 7]

$$\frac{l_m}{l_s} = \frac{f_s}{Z - f_m + f_s} \cdot \frac{Z}{f_m} \qquad (7)$$
$$= \frac{f_s}{f_m} \frac{1}{1 - \frac{f_m - f_s}{Z}}$$
$$\approx \frac{f_s}{f_m} (\because Z \gg f_m - f_s)$$

At this time, the synthesizing unit 57 generates a main image $I'_m$ by multiplying the size of the main image $I_m$ by $f_s/f_m$, and synthesizes this with the sub-image $I_s$.

Thus, as shown in D in FIG. 14, a synthesized image is generated of which the main image $I'_m$ is of a size smaller than the sub-image $I_s$.

Note that not only in the case of the size of imaging devices of the imaging units 51 and 55 being the same, but in the case that the relation of the sizes of the main image $I_m$ and sub-image $I_s$ are not as shown in D in FIG. 14, the size of the main image $I_m$ is multiplied by a predetermined number, whereby the size of the main image can be adjusted.

Returning to the flowchart in FIG. 10, in step S16 the display unit 58 displays the synthesized image from the synthesizing unit 57.

According to the above processing, a synthesized image such as shown in FIG. 2 is displayed wherein a standard image with a view image angle desired for photographing is synthesized in the center of a wide angle image having reduced image quality, whereby the user can simultaneously and easily confirm images of the two compositions.

Also, the user can confirm a composition other than the view angle desired for photographing in a wide-angle image, whereby an improved composition can be sought.

With the above description, the image other than the view angle desired for photographing has been described as a configuration whereby the image quality thereof is reduced and only the composition is confirmed, but an object included in the image other than the view angle desired for photographing can be displayed in an enhanced manner.

<2. Second Embodiment>

[Configuration Example of Digital Camera]

Figure 15:
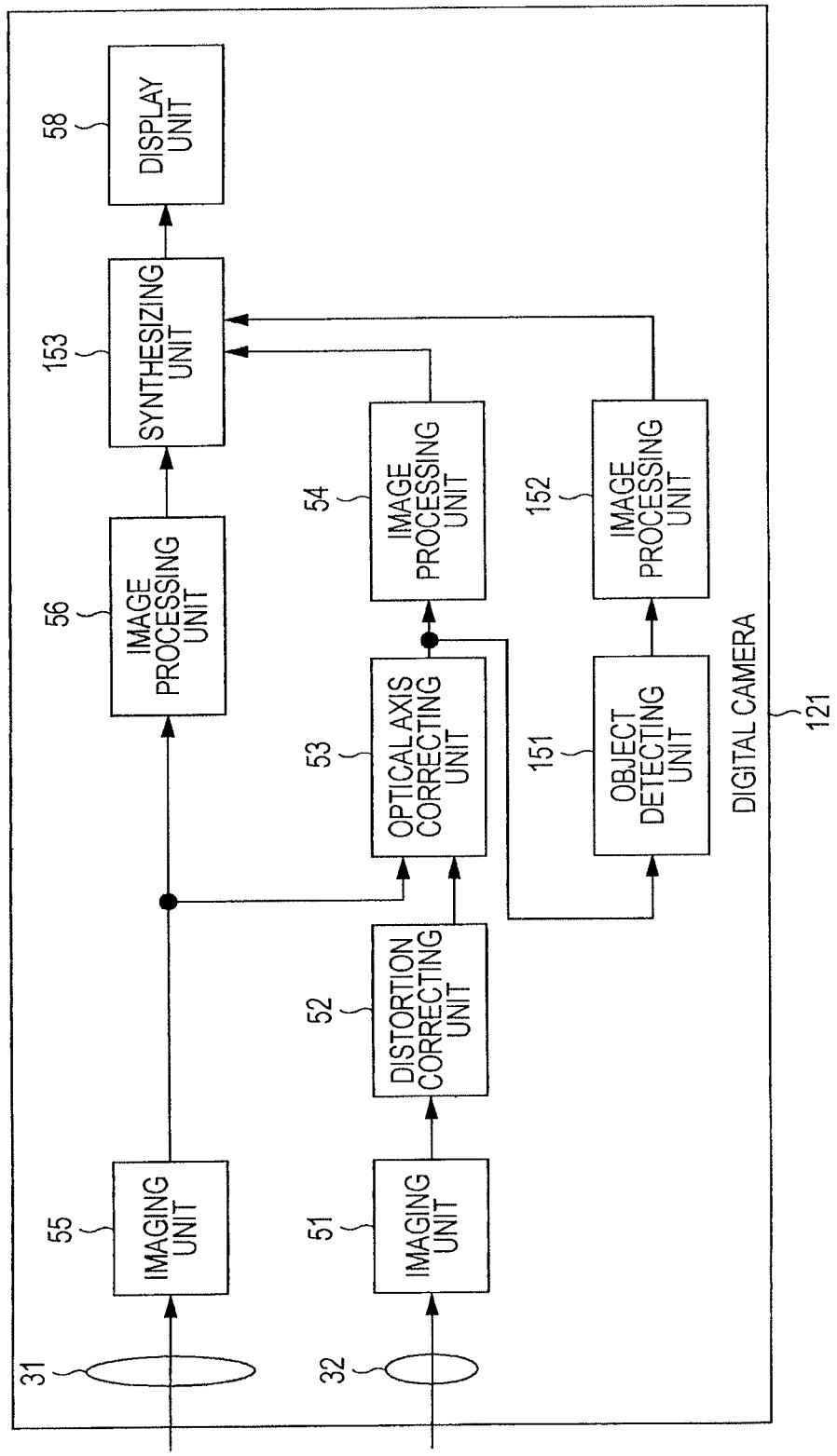
FIG. 15 is a block diagram showing another configuration example of a digital camera.

FIG. 15 shows a configuration example of a digital camera whereby an object in the image other than the view angle desired for photographing is displayed. Note that with the digital camera 121 in FIG. 15, a configuration having the same functions as that provided to the digital camera 11 in FIG. 3 are denoted with the same names and reference numerals, and description thereof will be omitted as appropriate.

That is to say, with the digital camera 121 in FIG. 15, the difference from the digital camera 11 in FIG. 3 is in the point that an object detecting unit 151 and image processing unit 152 are newly provided, and a synthesizing unit 153 is provided instead of the synthesizing unit 57.

The optical axis correcting unit 53 in FIG. 15 supplies to the image processing unit 54 the position information showing the position wherein the sub-image subjected to optical axis correcting and the main image in the sub-image are synthesized, while supplying the sub-image subjected to optical axis correcting to the object detecting unit 151.

The object detecting unit 151 detects an object in the sub-image from the optical axis correcting unit 53, and supplies the image of a region including a detected object (detected object image), along with the position information showing the position in the sub-image, to the image processing unit 152.

Two types of object detecting unit 151 configuration examples will be described with reference to FIG. 16 and FIG. 17.

Figure 16:
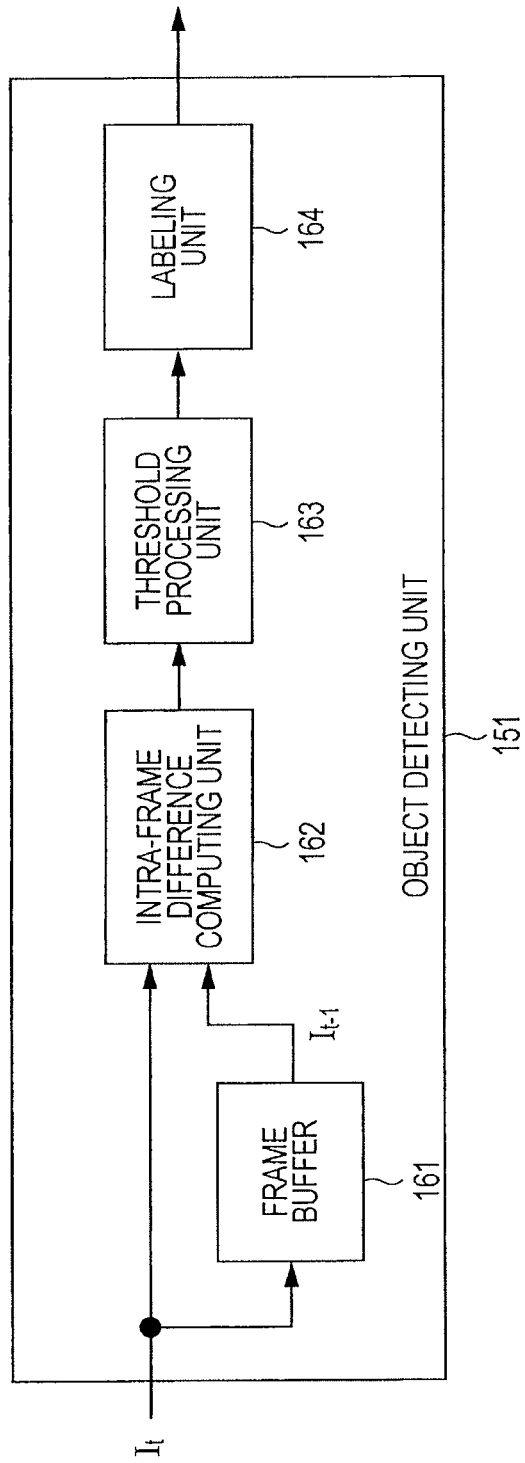
FIG. 16 is a block diagram showing a configuration example of an object detecting unit.

FIG. 16 shows a first configuration example of the object detecting unit 151.

The object detecting unit 151 in FIG. 16 is made up of a frame buffer 161, intra-frame difference computing unit 162, threshold processing unit 163, and labeling unit 164.

The frame buffer 161 stores the sub-images from the optical axis correcting unit 53 by each frame.

The intra-frame difference computing unit 162 reads out the sub-image $I_{t-1}$ that is one frame prior, stored in the frame buffer 161, and computes an intra-frame difference value which is the pixel value difference for each pixel, from the sub-image $I_{t-1}$ and the sub-image $I_t$ of the current frame from the optical axis correcting unit 53. The intra-frame difference computing unit 162 supplies the computing results to the threshold processing unit 163.

The threshold processing unit 163 binarizes by setting the pixel having a difference value of a predetermined threshold or greater as 1, and the pixel having a difference value of less than the predetermined threshold as 0, based on the intra-frame difference value from the intra-frame difference computing unit 162. Also, the threshold processing unit 163 divides the binarized image into predetermined blocks, for each block counts the pixels wherein the pixel value within the block is 1, and based on the count thereof detects the block having a count of the predetermined threshold or greater as a moving block. The threshold processing unit 163 supplies the detection results (moving blocks) to the labeling unit 164.

The labeling unit 164 performs labeling processing based on the moving blocks supplied by the threshold processing unit 163. Further, the labeling unit 164 detects a rectangle (outer contact frame) surrounding each labeled block from the outside, and supplies the detection result thereof as a detected object image to the image processing unit 152.

With the above configuration, the object detecting unit 151 can detect an object having motion in the sub-image.

Figure 17:
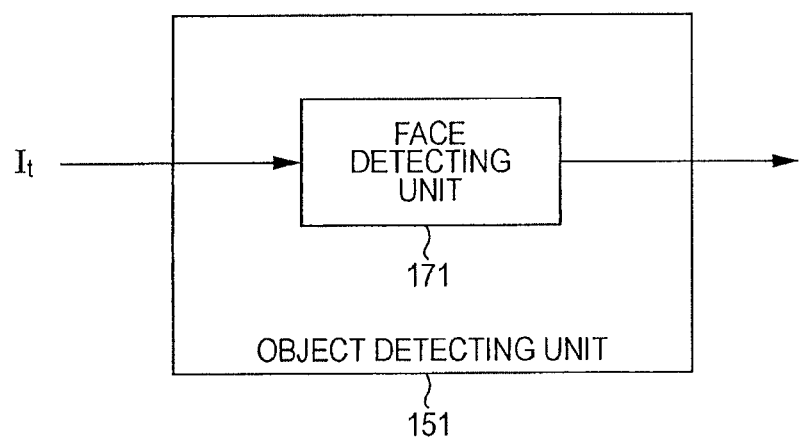
FIG. 17 is a block diagram showing a configuration example of an object detecting unit.

FIG. 17 shows a second configuration example of the object detecting unit 151.

The object detecting unit 151 in FIG. 17 is made up of a face detecting unit 171.

The face detecting unit 171 detects a face from the sub-image $I_t$ from the optical axis correcting unit 53, extracts the face image based on the position and size of the face detection region which is the region for detecting the face, and supplies this to the image processing unit 152 as a detected object image. For example, the face detecting unit 171 learns the face image of a face that is facing in various directions, compares the learned face image with the image in a region that is the same size as the face detection region in the sub-image $I_t$, and evaluates whether or not this is a face, thereby detecting the face.

With the above configuration, the object detecting unit 151 can detect the face of a person in the sub-image.

Note that with the above description, the object detecting unit 151 has a configuration to detect an object having movement or a person (face), but should not be limited to this, and a predetermined object (automobile, building, etc) may be detected.

Returning to the description in FIG. 15, the image processing unit 152 performs predetermined image processing (adjustments of picture, brightness, color density, hue, sharpness and so forth) on the detected object image from the object detecting unit 151 so as to increase the image quality thereof above that of the sub-image, and supplies this along with position information to the synthesizing unit 153.

Now, a configuration example of the image processing unit 152 will be described with reference to the block diagram in FIG. 18.

Figure 18:
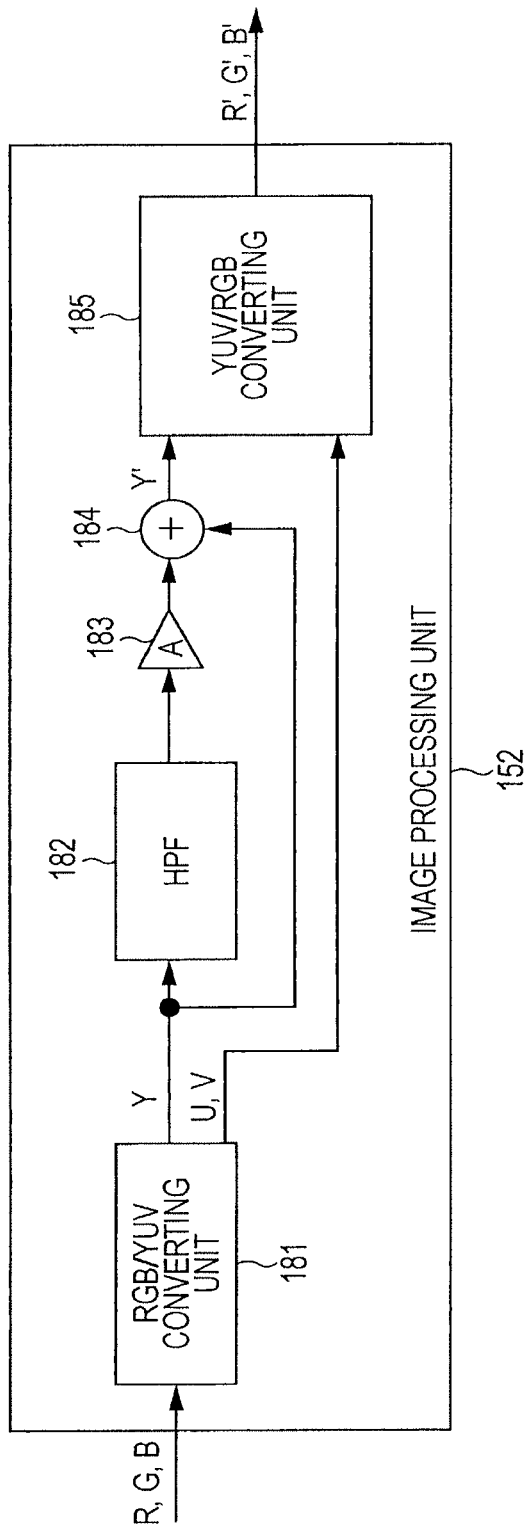
FIG. 18 is a block diagram showing a configuration example of an image processing unit.

FIG. 18 shows a configuration example of the image processing unit 152 subjecting the detected object image to enhancement processing.

The image processing unit 152 in FIG. 18 is made up of a RGB/YUV converter 181, HPF 182, amplifier 183, adding unit 184, and YUV/RGB converter 185. Note that the RGB/YUV converter 181, HPF 182, amplifier 183, adding unit 184, and YUV/RGB converter 185 has similar functions as the RGB/YUV converter 91, HPF 92, amplifier 93, adding unit 94, and YUV/RGB converter 95 provided to the image processing unit 56 shown in FIG. 7, so description thereof will be omitted.

With the above configuration, the image processing unit 152 can subject the detected object image to enhancement processing.

Returning to the description in FIG. 15, the synthesizing unit 153 synthesizes the main image from the image processing unit 56 and the sub-image from the image processing unit 54, based on the position information from the image processing unit 54. Further, the synthesizing unit 153 synthesizes the detected object image from the object detecting unit 151 to the region corresponding to the sub-image of the synthesized image that has been synthesized, based on the position information from the image processing unit 152, and supplies the synthesized image thereof to the display unit 58.

[Image Display Processing of Digital Camera]

Figure 19:
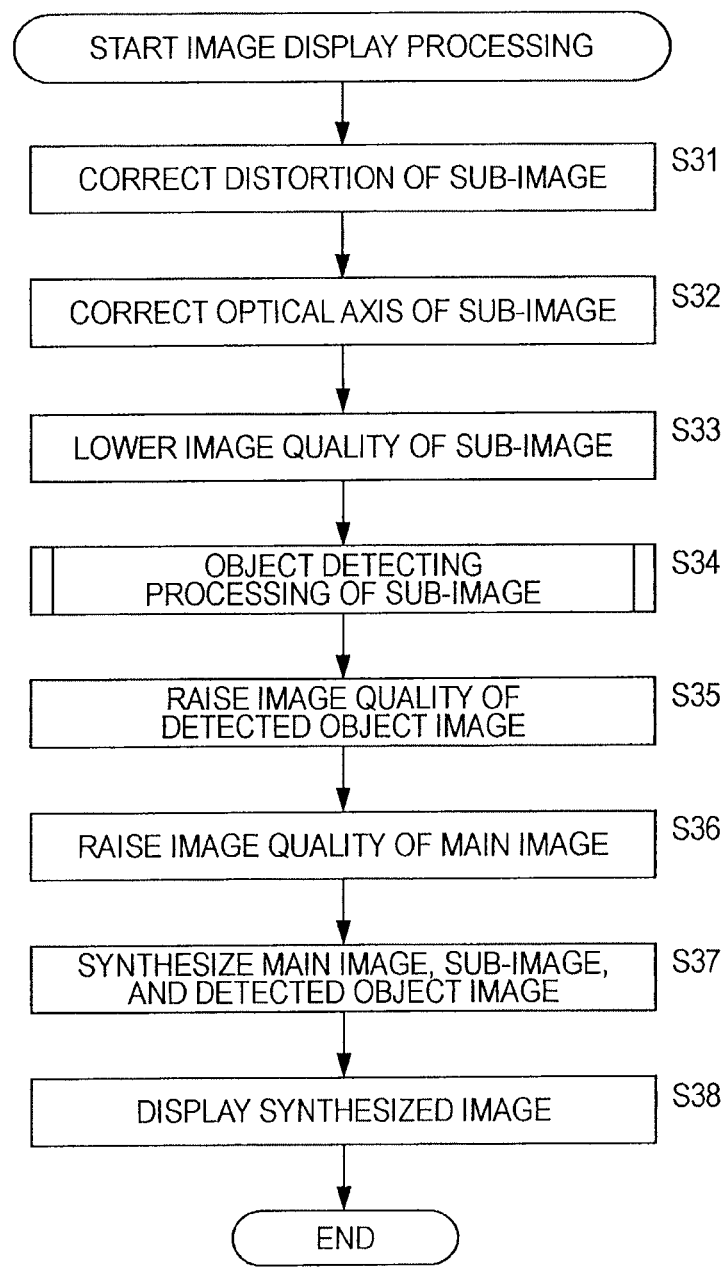
FIG. 19 is a flowchart describing the image display processing of the digital camera in FIG. 15.

Next, the image display processing of the digital camera 121 in FIG. 15 will be described with reference to the flowchart in FIG. 19. Note that the processing in steps S31 through S33 and S36 in the flowchart in FIG. 19 is similar to the processing in steps S11 through S14 described with reference to the flowchart in FIG. 10, so description thereof will be omitted.

That is to say, in step S34, the object detecting unit 151 performs object detecting processing to detect an object in the sub-image from the optical axis correcting unit 53. The object detecting unit 151 supplies the image of the region including the detected object (detected object image), along with the position information expressing the position in the sub-image, to the image processing unit 152.

Figure 20:
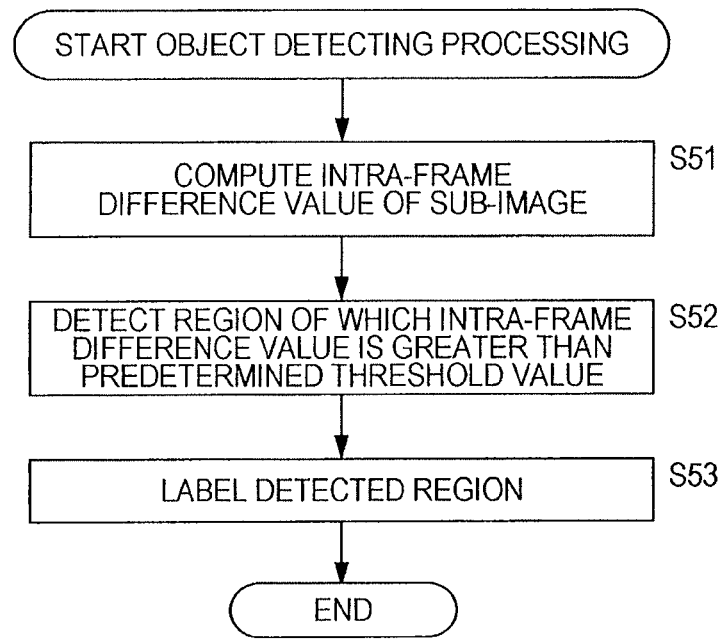
FIG. 20 is a flowchart describing the example of the object detecting processing.

Now, an example of the object detecting processing to detect an object having motion which corresponds to the object detecting processing in step S34 will be described with reference to the flowchart in FIG. 20.

In step S51, the intra-frame difference computing unit 162 reads out the sub-image $I_{t-1}$ that is one frame prior, stored in the frame buffer 161, and computes an intra-frame difference value for each pixel, from the sub-image $I_{t-1}$ and the sub-image $I_t$ of the current frame from the optical axis correcting unit 53. The intra-frame difference computing unit 162 supplies the computing results to the threshold processing unit 163.

In step S52, the threshold processing unit 163 binarizes by setting the pixel having a difference value of a predetermined threshold or greater as 1, and the pixel having a difference value of less than the predetermined threshold as 0, based on the intra-frame difference value from the intra-frame difference computing unit 162. Also, the threshold processing unit 163 divides the binarized image into predetermined blocks, for each block counts the pixels wherein the pixel value within the block is 1, and based on the count thereof detects the block having a count of the predetermined threshold or greater as a moving block. The threshold processing unit 163 supplies the detection results (moving blocks) to the labeling unit 164.

In step S53, the labeling unit 164 performs labeling processing based on the moving blocks supplied by the threshold processing unit 163. Further, the labeling unit 164 detects a rectangle (outer contact frame) surrounding each labeled block from the outside, and supplies the detection result thereof as a detected object image to the image processing unit 152.

According to the above processing, an object having motion can be detected in the sub-image.

Also, the face of a person may be detected in the object detecting processing in Step S34.

Figure 21:
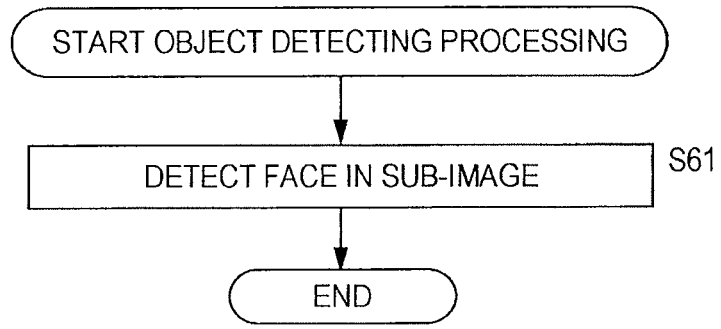
FIG. 21 is a flowchart describing another example of the object detecting processing.

Now, an example of the object detecting processing to detect the face of a person will be described with reference to the flowchart in FIG. 21.

In step S61, the face detecting unit 171 detects a face from the sub-image $I_t$ from the optical axis correcting unit 53, extracts the face image based on the position and size of the face detecting region which is the region to detect a face, and supplies this to the image processing unit 152 as a detected object image.

According to the above processing, the face of a person can be detected in the sub-image.

Note that the object detecting processing described with reference to the flowchart in FIG. 20 and FIG. 21 can be executed in parallel by the object detecting unit 151 of the digital camera 121 having both of the configurations described in FIG. 16 and FIG. 17.

Returning to the flowchart in FIG. 19, in step S35 the image processing unit 152 subjects the detected object image from the object detecting unit 151 to predetermined image processing so as to improve the image quality above that of the sub-image, and supplies this to the synthesizing unit 153, along with position information. More specifically, the image processing unit 152 increases the brightness, saturation, or lightness value of the detected object image. The image processing unit 152 supplies the detected object image having an increased image quality to the synthesizing unit 153. Now, the image processing unit 152 can also add a frame of a predetermined color to the periphery of the detected object image and supply this to the synthesizing unit 153.

In step S37, the synthesizing unit 153 synthesizes the main image from the image processing unit 56 and the sub-image from the image processing unit 54, based on the position information from the image processing unit 54. Further, the synthesizing unit 153 synthesizes the detected object image from the object detecting unit 151 in the region corresponding to the sub-image of the synthesized image that has been synthesized, based on the position information from the image processing unit 152, for example as shown in FIG. 22, and supplies the synthesized image thereof to the display unit 58.

Figure 22:
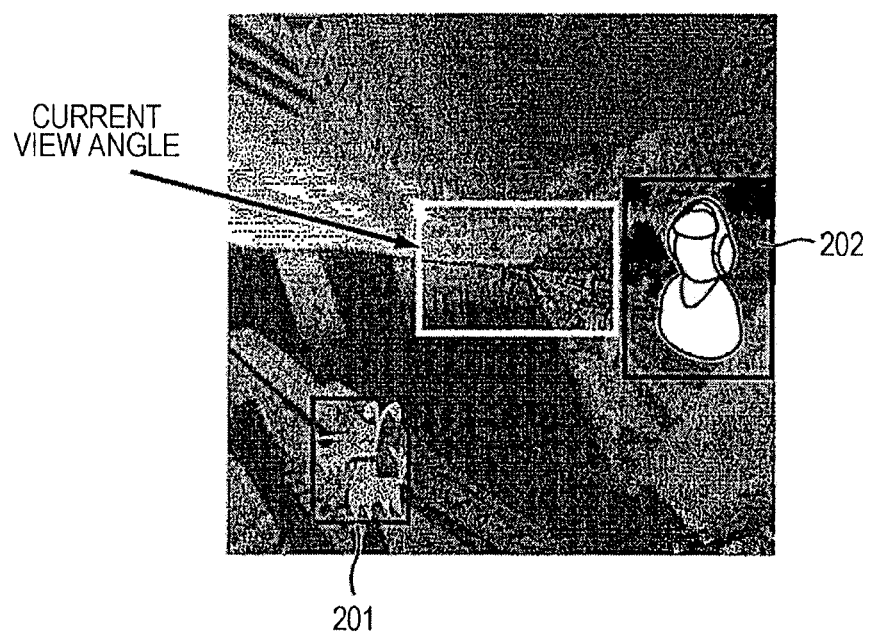
FIG. 22 is a diagram showing an example of a synthesized imaged wherein a detected object image has been enhanced and displayed.

FIG. 22 shows an example of a synthesized image wherein the detected object image has been displayed in an enhanced manner.

In FIG. 22, in addition to the synthesized image shown in FIG. 2, the detected object image 201 and detected object image 202 are displayed in the region corresponding to the sub-image of the synthesized image.

In FIG. 22, the detected object image 201 is an image of a dog serving as an object having movement, the object detecting unit 151 in FIG. 16 detects the object (dog), and the image processing unit 152 increases the image quality of the detected object image 201, thereby enhancement and displaying this in the synthesized image.

Also, the detected object image 202 is an image of a person, and the object detecting unit 151 in FIG. 17 detects the face of a person and the image processing unit 152 increases the image quality of the detected object image 202, thereby enhancement and displaying this in the synthesized image.

Thus, an image on which an object included in the image other than the view angle desired for photography (main image) is displayed in an enhanced manner on the synthesized image, whereby in the case of performing so-called "pre-focusing" photography which takes in a still image in the state that a focal point position has been fixed beforehand, even if an object other than a desired subject is framed in the main image, the object thereof can be confirmed on the synthesized image, whereby shutter timing can be more readily measured.

According to the above processing, a standard image of the view angle desired for photography is synthesized in the center of the wide angle image with reduced image quality, while a synthesized image which is an image of which an enhanced object included in the image other than the view angle desired for photography has been synthesized is displayed. Accordingly, the user can readily confirm images of two compositions simultaneously, while confirming an object included in the image other than the image angle desired for photography.

Note that with the above description, the configuration is such that an object is detected only in the sub-image, but a configuration may detect an object in the main image also. With such a configuration, an object can be detected such as displayed between the sub-image and main image, whereby for example, the object can be enhanced within the sub-image and the image quality can be decreased within the main image. Thus, even in the case that an object other than the desired subject enters the frame in the main image, the display of such object can be made less obvious.

With the above description, a configuration to display the synthesized image centering around the image view that the user desires to photograph has been described, but a synthesized image can also be displayed of the view angle to be photographed with a more appropriate composition.

<3. Third Embodiment>

[Configuration Example of Digital Camera]

Figure 23:
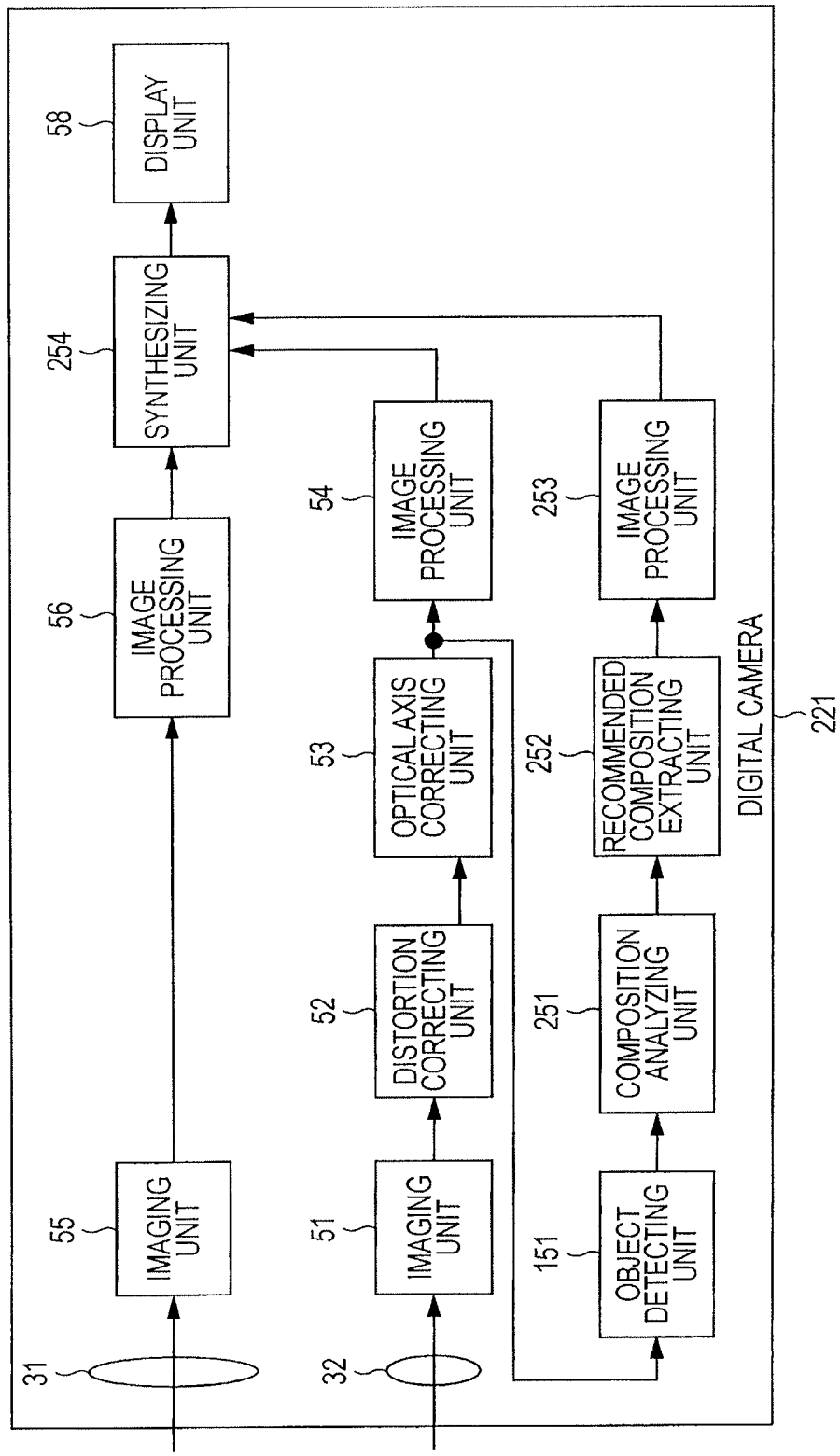
FIG. 23 is a block diagram showing another configuration example of a digital camera.

FIG. 23 shows a configuration example of a digital camera which can display the view angle to the user so as to photograph in a synthesized image, with a more appropriate composition. Note that with the digital camera 221 in FIG. 23, a configuration having similar functions as that provided to the digital camera 121 in FIG. 15 will have the same names and same reference numerals, so the descriptions thereof will be omitted as appropriate.

That is to say, with the digital camera 221 in FIG. 23, the difference from the digital camera 121 in FIG. 15 is the points that a composition analyzing unit 251 and recommendation composition extracting unit 252 are newly provided, and instead of an image processing unit 152 and synthesizing unit 153, an image processing unit 253 and synthesizing unit 254 are provided.

The object detecting unit 151 in FIG. 23 detects an object in the sub-image from the optical axis correcting unit 53, and supplies the position information expressing the position in the sub-image of the detected object, and the sub-image, to the composition analyzing unit 251.

The composition analyzing unit 251 analyzes the sub-image from the object detecting unit 151 and the composition that corresponds to the position of the object within the sub-image based on the position information of the object within the sub-image, and makes a determination. For example, the composition analyzing unit 251 stores multiple composition patterns beforehand, using pattern-matching selects the composition pattern closest to the disposal of the object within the sub-image from within such composition patterns, and sets the composition corresponding to the sub-image (recommended composition). The composition analyzing unit 251 supplies the composition information showing the determined composition (e.g. the position at the upper left of a rectangle which is the outline of the composition and the position on the lower right thereof) along with the sub-image to the recommended composition extracting unit 252.

The recommended composition extracting unit 252 extracts an image of the recommended composition (recommended composition image) from the sub-image based on the sub image and the composition information from the composition analyzing unit 251, and supplies this along with the composition information to the image processing unit 253.

The image processing unit 253 has the same function as the image processing unit 56, and performs predetermined image processing (adjustments of picture, lightness value, color density, hue, sharpness and so forth) on the recommended composition image from the recommended composition extracting unit 252 so as to increase the image quality above that of the sub-image, and supplies this along with composition information to the synthesizing unit 254.

The synthesizing unit 254 synthesizes the main image from the image processing unit 56 and the sub-image from the image processing unit 54, based on the position information from the image processing unit 54. Further, the synthesizing unit 254 synthesizes the recommended composition image from the image processing unit 253 to the region corresponding to the sub-image of the synthesized image that has been synthesized, based on the composition information from the image processing unit 253, and supplies the synthesized image to the display unit 58.

[Image Display Processing of Digital Camera]

Figure 24:
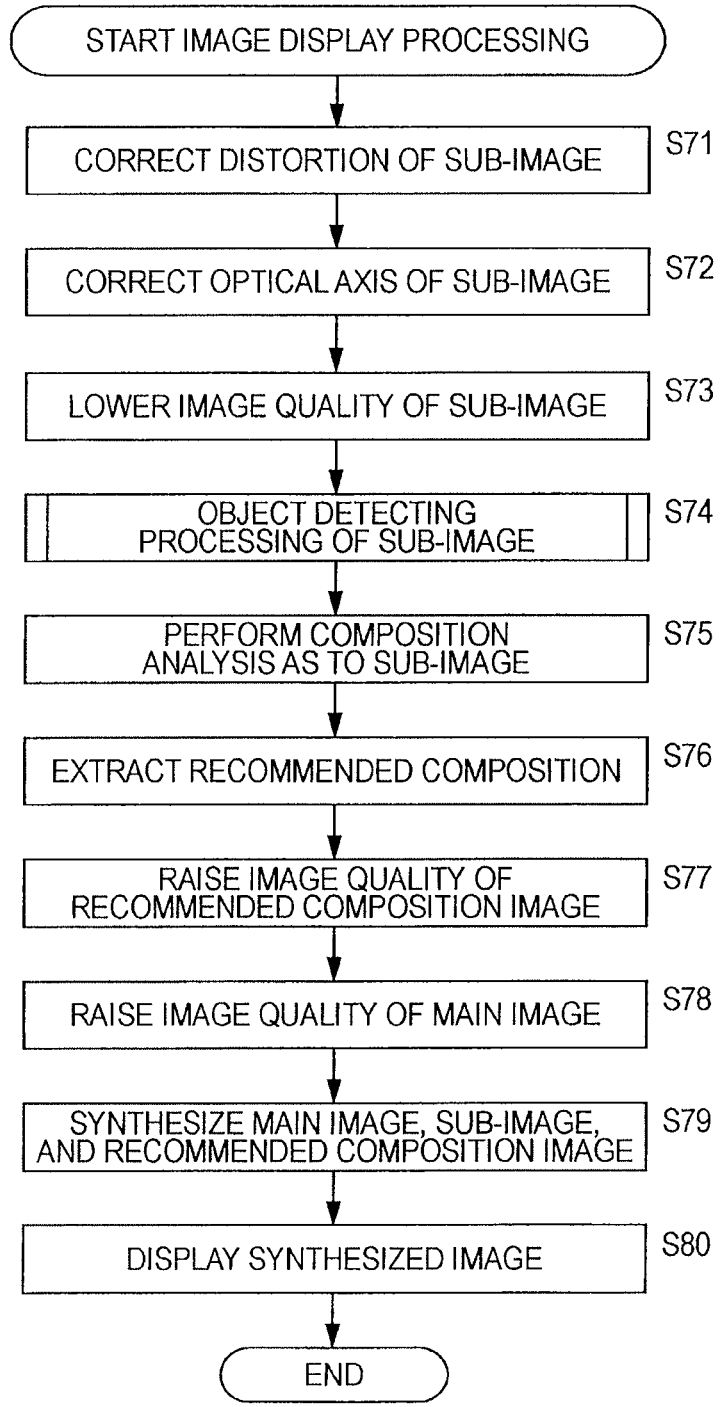
FIG. 24 is a flowchart describing the image display processing of the digital camera in FIG. 23.

Next, image display processing of the digital camera 221 in FIG. 23 will be described with reference to the flowchart in FIG. 24. Note that the processing in steps S71 through S74 and S78 in the flowchart in FIG. 24 are similar to the processing in steps S31 through S34 and S36 described with reference to the flowchart in FIG. 10, so description thereof will be omitted.

In step S75, the composition analyzing unit 251 analyzes the composition corresponding to disposal of an object within a sub-image, based on the sub-image from the object detecting unit 151 and the position information of the object within the sub-image, and determines a recommended composition. For example, the composition analyzing unit 251 stores multiple composition patterns beforehand, using pattern-matching selects the composition pattern closest to the disposal of the object within the sub-image from within such composition patterns, and sets this as the recommended composition corresponding to the sub-image. The composition analyzing unit 251 supplies the composition information showing the determined composition, along with the sub-image, to the recommended composition extracting unit 252.

Figure 25:
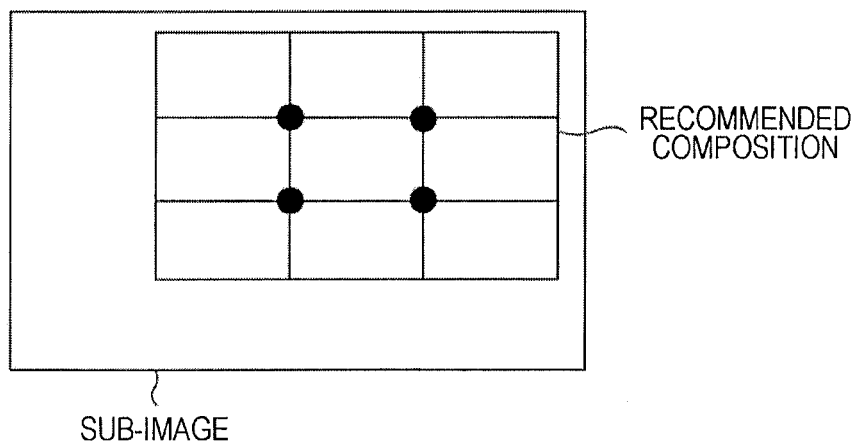
FIG. 25 is a diagram showing an example of a recommended composition.

FIG. 25 shows an example of a recommended composition determined by the composition analyzing unit 251.

The composition shown in FIG. 25 is a composition called a tri-partition composition, and is known as an image (photograph) that is balanced by having an object (subject) in one of the positions at the intersection of the vertical lines and horizontal lines (the solid circles in the diagram). Note that the composition determined by the composition analyzing unit 251 (composition pattern) is not limited to a tri-partition composition, and multiple types are prepared, such as a horizontal line composition used to give width in the horizontal direction, a vertical line composition used to enhance the vertical direction, and a ratio composition used when two of the same or similar items are next to one another.

Returning to the flowchart in FIG. 24, in step S76 the recommended composition extracting unit 252 extracts the recommended composition image from the sub-image based on the composition information and sub-image from the composition analyzing unit 251, and supplies this along with the composition information to the image processing unit 253.

In step S77, the image processing unit 253 subjects the recommended composition image from the recommended composition extracting unit 252 to predetermined image processing so as to increase the image quality above that of the sub-image, and supplies this along with the composition information to the synthesizing unit 254. Now, the image processing unit 253 can also add a frame of a predetermined color and line type to the periphery of the recommended composition image and supply this to the synthesizing unit 254.

In step S79, the synthesizing unit 254 synthesizes the main image from the image processing unit 56 and the sub-image from the image processing unit 54, based on the position information from the image processing unit 54. Further, the synthesizing unit 254 synthesizes the recommended composition image from the image processing unit 253 to the region corresponding to the sub-image of the synthesized image that has been synthesized, based on the composition information from the image processing unit 253, such as shown in FIG. 26 for example, and supplies the synthesized image thereof to the display unit 58.

Figure 26:
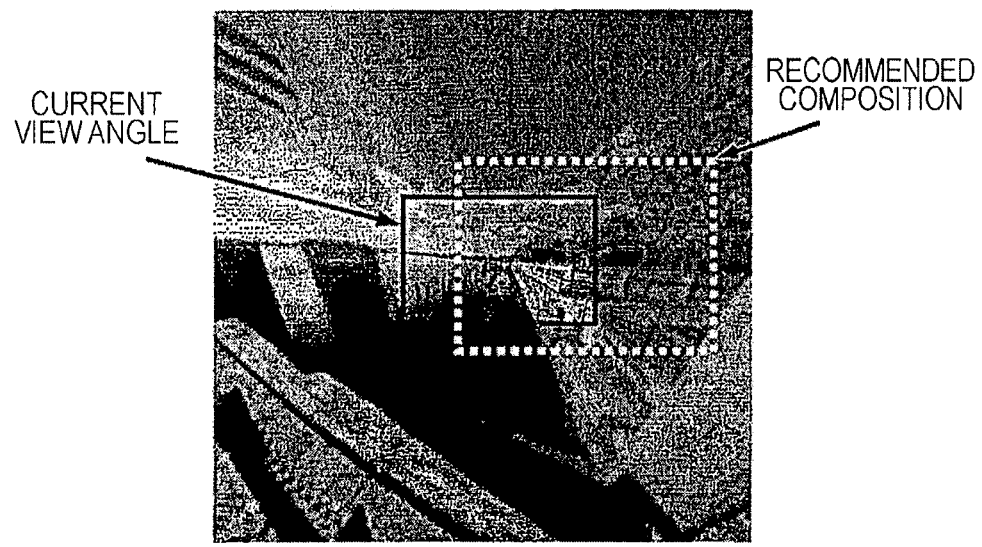
FIG. 26 is a diagram showing an example of a synthesized image displaying a recommended composition.

FIG. 26 shows an example of the synthesized image having displayed a recommended composition.

In FIG. 26, in addition to the synthesized image shown in FIG. 2, a recommended composition is shown on the synthesized image thereof with broken lines indicating the outline thereof.

In the above description, the image quality of an image within the recommended composition is greater than the image quality of the sub-image, but in the case that a portion of the main image (current view angle) and a portion of the recommended composition overlap, these may not be able to be distinguished from one another. Thus, as shown in FIG. 26, a recommended composition may be to simply display only the outline (view angle) thereof.

According to the above processing, a recommended composition can be displayed on the synthesized image.

Thus, a recommended composition is displayed on the synthesized image, whereby the user can confirm a more appropriate composition than the composition currently used for photographing (recording).

A digital camera having two imaging systems which can display more appropriate compositions has been described above, but even with a digital camera having only one imaging system, more appropriate compositions can be displayed.

Now, recently, as high-definition television receivers have become more popular, requests have increased for imaging, recording, and viewing on the high-definition television receiver an image of which the aspect ratio (horizontal-to-vertical ratio) is 16:9 from the imaging apparatus such as a digital camera.

Figure 27:
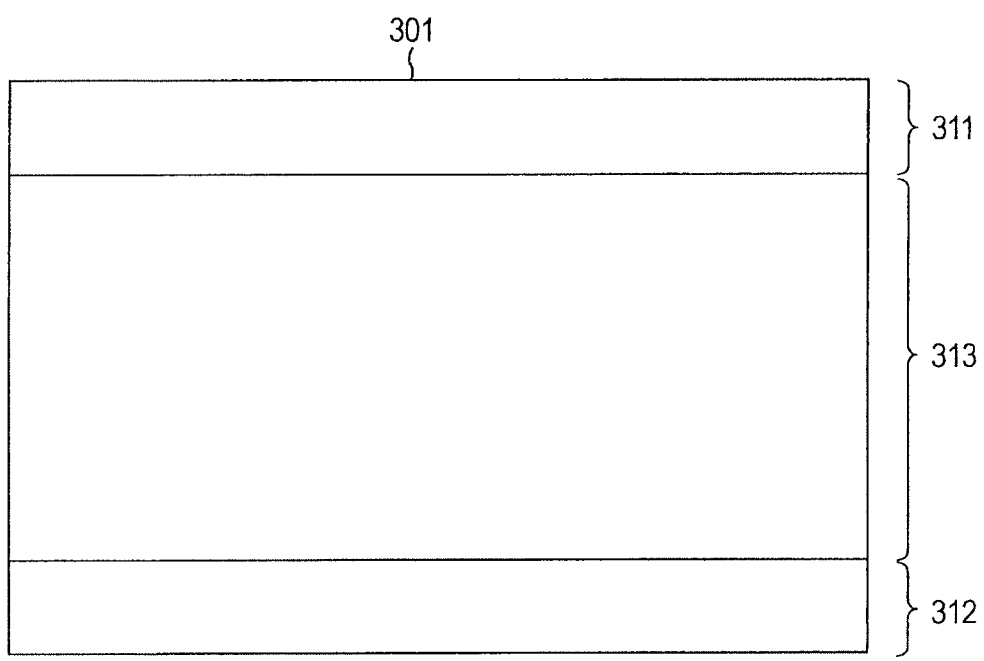
FIG. 27 is a diagram describing the aspect ratio of an imaging device.

Therefore, a general imaging apparatus such as shown in FIG. 27 having a solid-state imaging device (hereafter called imaging device) 301 of which the aspect ratio is 4:3 (or 3:2) may have a standard mode to image an image of which the aspect ratio is 4:3 (or 3:2) and a panorama mode to image an image of which the aspect ratio is 16:9. In standard mode, the entire imaging device 301 is used and an image of which the aspect ratio is 4:3 (or 3:2) is imaged, displayed, and recorded. On the other hand, in panorama mode, an imaging device of a rectangular region 313 whereby the aspect ratio is 16:9 is used, instead of the imaging device of the region 311 on the upper side and the region 312 on the lower side of the imaging device 301 in FIG. 27 and an image of which the aspect ratio is 16:9 is imaged, displayed, and recorded.

With an imaging apparatus as described above, the display region of the display unit for displaying a so-called through image is configured so as to display an image corresponding to the entire imaging device 301 in FIG. 27. Accordingly, in the case of the user photographing a subject in panorama mode, a display region wherein a through image is displayed on the display unit becomes a region corresponding to the rectangle region 313 of the entire imaging device 301 in FIG. 27.

Thus, hereafter, a digital camera will be described that has only one imaging system wherein a composition, which is a more appropriate composition than the user is attempting to photograph, is displayed in panorama mode in an imaging apparatus such as described above.

<4. Fourth Embodiment>

[Functional Configuration Example of Digital Camera]

Figure 28:
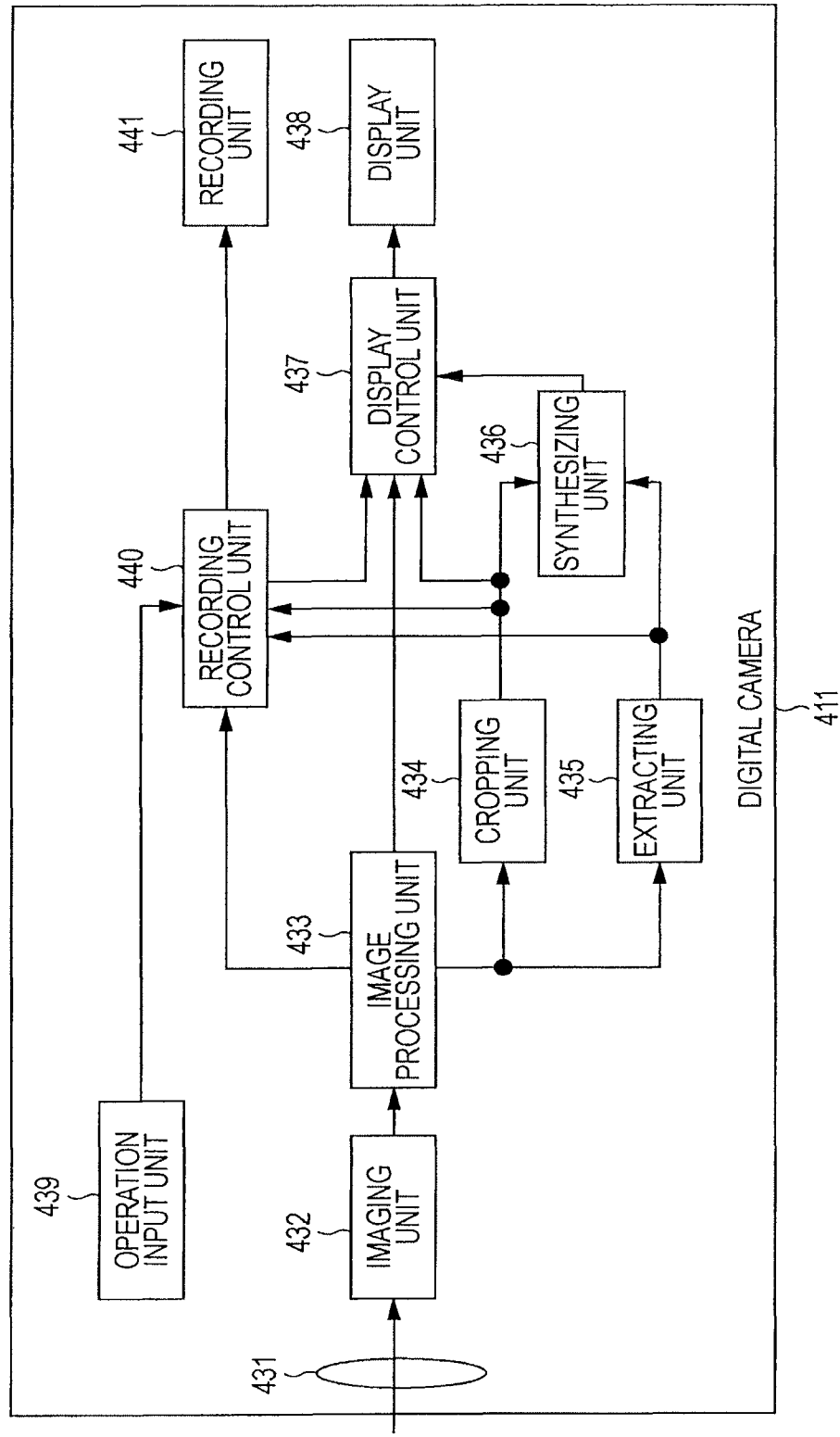
FIG. 28 is a block diagram showing yet another configuration example of a digital camera.

FIG. 28 shows a configuration example of a digital camera having only one imaging system.

The digital camera 411 in FIG. 28 is made up of a lens 431, imaging unit 432, image processing unit 433, cropping unit 434, extracting unit 435, synthesizing unit 436, display control unit 437, display unit 438, operating input unit 439, recording control unit 440, and recording unit 441.

The lens 431 is a so-called standard lens, similar to the main lens 31 of the digital camera in FIG. 1.

The imaging unit 432 is configured so as to include an imaging device of which the aspect ratio is 4:3 such as a CCD (Charge Coupled Device) or the like and an A/D converter, for example. The imaging unit 432 images a subject by receiving light from the lens 431 and performing photoelectric conversion, and subjects the obtained analog image signal to A/D conversion. The imaging unit 432 supplies the digital image data obtained as a result of the A/D conversion (hereafter called imaging image) to the image processing unit 433.

The image processing unit 433 subjects the imaging image from the imaging unit 432 to predetermined image processing. In the case that the imaging mode of the image processing unit 433 is a standard mode which images an image of which the aspect ratio is 4:3, the imaging image subjected to image processing is supplied to the display control unit 437 and recording control unit 440. Also, in the case that the imaging mode of the image processing unit 433 is a panorama mode which images an image of which the aspect ratio is 16:9, the imaging image subjected to image processing is supplied to the cropping unit 434 and extracting unit 435.

Upon the imaging image having been supplied from the image processing unit 433, the cropping unit 434 crops out from the imaging image thereof an image of which the aspect ratio is 16:9, which differs in size from the imaging image. The cropping unit 434 supplies the cropped out image (cropped image) to the synthesizing unit 436, display control unit 437, or recording control unit 440, as necessary.

Upon the imaging image having been supplied from the image processing unit 433, the extracting unit 435 detects a subject with a high degree of focus in the imaging image thereof, includes the subject thereof, and extracts an image of a region of which the aspect ratio is 16:9, which differs from the size of the imaging image including the subject. The extracting unit 435 supplies the extracted image to the synthesizing unit 436 or recording control unit 440, as necessary.

The synthesizing unit 436 synthesizes the cropped image from the cropping unit 434 and the extracted image from the extracting unit 435, and supplies the synthesized image that has been synthesized to the display control unit 437.

The display control unit 437 controls the display unit 438, and displays various types of images in the display unit 438. For example, in the case that the imaging mode is in standard mode, the display control unit 437 displays the imaging image supplied from the image processing unit 433 on the display unit 438. Also, in the case that the imaging mode is in panorama mode, the display control unit 437 displays the cropped image supplied from the cropping unit 434 or the synthesized image supplied from the synthesizing unit 436 on the display unit 438.

The display unit 438 displays various types of images as appropriate under control of the display control unit 437.

The operating input unit 439 is operated by a user in order to input instructions as to the digital camera 411. The operating input unit 439 is made up of various types of operating buttons, a remote control, touch panel, microphone, and so forth, for example, and receives operations from the user and supplies signals (information) indicating such operation content to each block of the digital camera 411.

The recording control unit 440 controls the recording unit 441. For example, in the case that the imaging mode of the recording control unit 440 is in standard mode, the imaging image from the image processing unit 433 is recorded in the recording unit 441, based on signals from the operating input unit 439. Also, in the case that the imaging mode of the recording control unit 440 is in panorama mode, the cropped image from the cropping unit 434 and the extracted image from the extracting unit 435 are recorded in the recording unit 441, based on signals from the operating input unit 439. Further, the recording control unit 440 reads the image out from the recording unit 441, based on signals from the operating input unit 439, and this is then supplied to the display control unit 437.

The recording unit 441 records various types of images as appropriate, under control of the recording control unit 440.

[Image Display Processing of Digital Camera]

Figure 29:
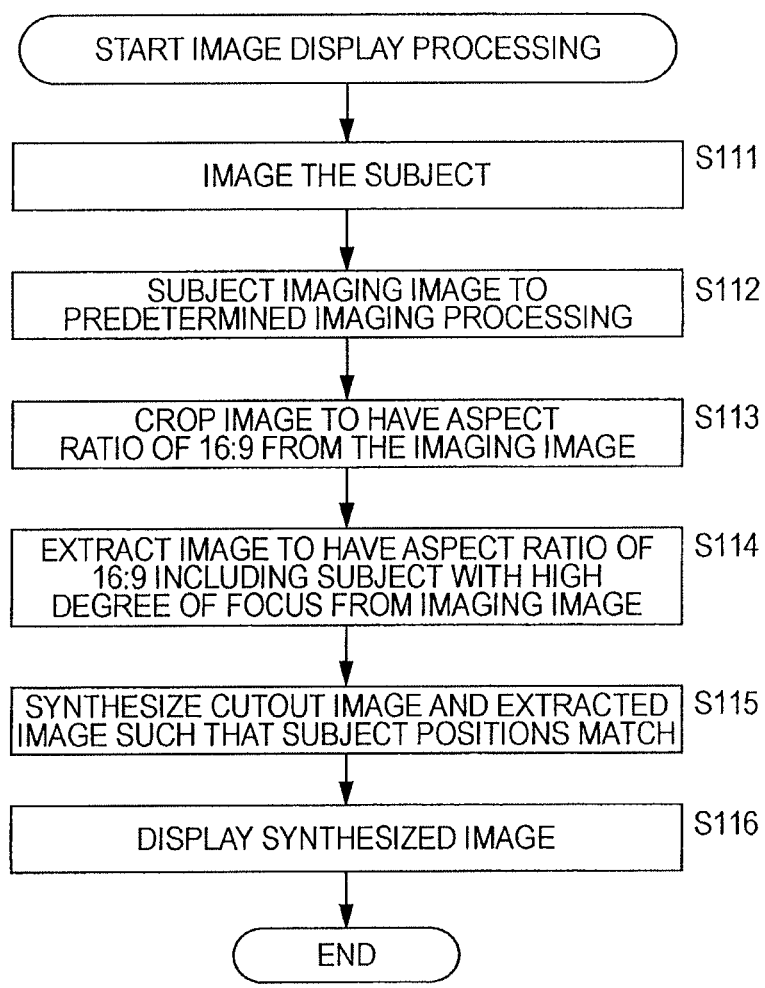
FIG. 29 is a flowchart describing the image display processing of the digital camera in FIG. 28.

Next, the image display processing of the digital camera 411 in FIG. 28 will be described with reference to the flowchart in FIG. 29. Note that the image display processing in FIG. 29 is started in the case that the operating input unit 439 receives operations from the user indicating that panorama mode is selected as the imaging mode.

In step S111, the imaging unit 432 images a subject. More specifically, the imaging unit 432 images the subject by receiving light from the lens 431 and performing photoelectric conversion, subjecting the obtained analog image signal to A/D conversion, and supplying the obtained imaging image to the image processing unit 433.

In step S112, the image processing unit 433 performs image processing such as demosaic processing, white balance adjusting processing, gamma correction processing and so forth as to the imaging image from the imaging unit 432, and supplies this to the cropping unit 434 and extracting unit 435.

In step S113, the cropping unit 434 crops out an image for which the aspect ratio is 16:9 from the imaging image supplied from the image processing unit 433, and supplies the cropped image obtained as a result thereof to the synthesizing unit 436. More specifically, the cropping unit 434 crops out the image of the portion corresponding to the rectangular region 313 in the imaging device 301 described in FIG. 27 of the imaging image of which the aspect ratio is 4:3 from the image processing unit 433.

Figure 30:
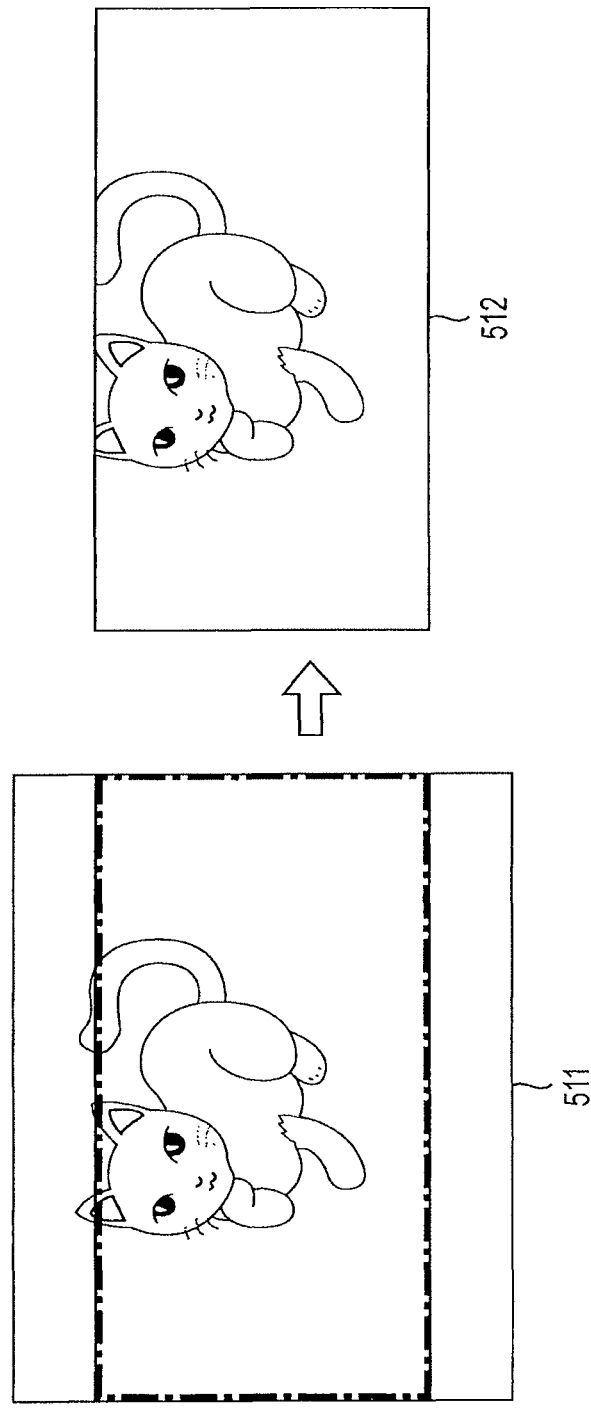
FIG. 30 is a diagram describing a cropped image.

For example, as shown on the left side in FIG. 30, in the case that an imaging image 511 (aspect ratio of 4:3) wherein the subject is a cat is obtained, the cropping unit 434 crops out the image of the region shown with the dotted-broken line in the imaging image 511, and obtains the cropped image 512 shown on the right side in FIG. 30. As shown in FIG. 30, in the cropped image 512 of which the aspect ratio is 16:9, the cat serving as the subject is positioned on the overall upper side, and the head portion including the ear is cut off. The cropped image 512 cannot be said to be an image with a good composition for an image to be photographed and displayed in panorama mode.

As described above, with the conventional digital camera having the imaging device of which the aspect ratio is 4:3, in the case of a user photographing a subject in panorama mode, the image displayed on the display unit becomes the image in the region shown with the dotted-broken line in FIG. 30 as to the imaging image 511 that is imaged by the entire imaging device. In the case that a user not accustomed to such operations uses such a digital camera in panorama mode, the display unit may display and record an image such as in the cropped image 512 in FIG. 30.

Returning to the flowchart in FIG. 29, in step S114 the extracting unit 435 detects a subject having a high degree of focus in the imaging image supplied from the image processing unit 433. The extracting unit 435 extracts an image of the region of which the aspect ratio of 16:9 that includes the subject thereof, and supplies the extracted image obtained as a result thereof to the synthesizing unit 436.

More specifically, the extracting unit 435 generates a brightness information map showing information relating to brightness, a color information map showing information relating to color, an edge information map showing information relating to edges, and motion information map showing information relating to motion, for each region of the imaging image.

Now, in the case that each of the brightness information map through the motion information map do not have to be individually distinguished, and these are simply called information maps, the information included in these information maps is information showing greater feature quantities of features included than in the region that includes the subject. The information map becomes that wherein the information is correlated to each region of the imaging image and arrayed. That is to say, the information map is information showing the feature amounts in each region of the imaging image.

Accordingly, the region having more information quantity in each information map, i.e. the region on the imaging image corresponding to the region having greater feature quantity, becomes a region having a higher probability that the subject is included, and the region that the subject is included in the imaging image can be identified by each information map.

The extracting unit 435 identifies a region of which the aspect ratio is 16:9, which includes the subject in the imaging image, based on the brightness information map, color information map, edge information map, and motion information map, and extracts the image in this region as the extracted image.

Figure 31:
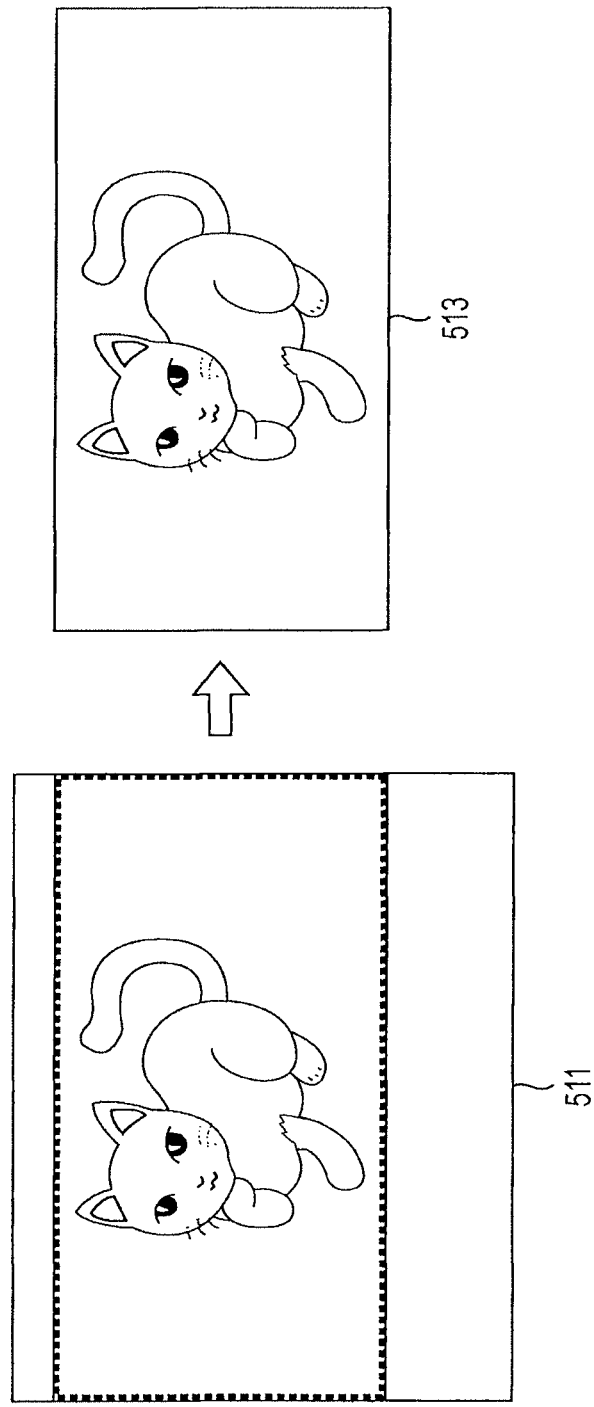
FIG. 31 is a diagram describing an extracted image.

For example, as shown on the left side in FIG. 31, in the case that the imaging image 511 (aspect ratio 4:3) is obtained, the extracting unit 435 detects a cat serving as the subject as the object having a high degree of focus in the imaging image 511, extracts the image of the region shown with broken lines (aspect ratio 16:9) so as to include the subject, and obtains the extracting image 513 shown on the right side of FIG. 31. As shown in FIG. 31, the cat serving as the subject is positioned roughly in the center of the extracted image 513 of which the aspect ratio is 16:9. The extracted image 513 is an image having a good composition as an image to be photographed and displayed in panorama mode.

Note that a method for extracting information from an imaging image such as brightness, color, and edges are disclosed in detail in "Laurent Itti, Christof Koch, and Ernst Niebur, "A Model of Saliency-Based Visual Attention for Rapid Scene Analysis"", for example.

Returning to the flowchart in FIG. 29, in step S115 the synthesizing unit 436 synthesizes the cropped image from the cropping unit 434 and the extracted image from the extracting unit 435 so that the positions of the subject match, and supplies the synthesized image that has been synthesized to the display control unit 437.

In step S116, the display control unit 437 displays the synthesized image supplied from the synthesizing unit 436 on the display unit 438.

Figure 32:
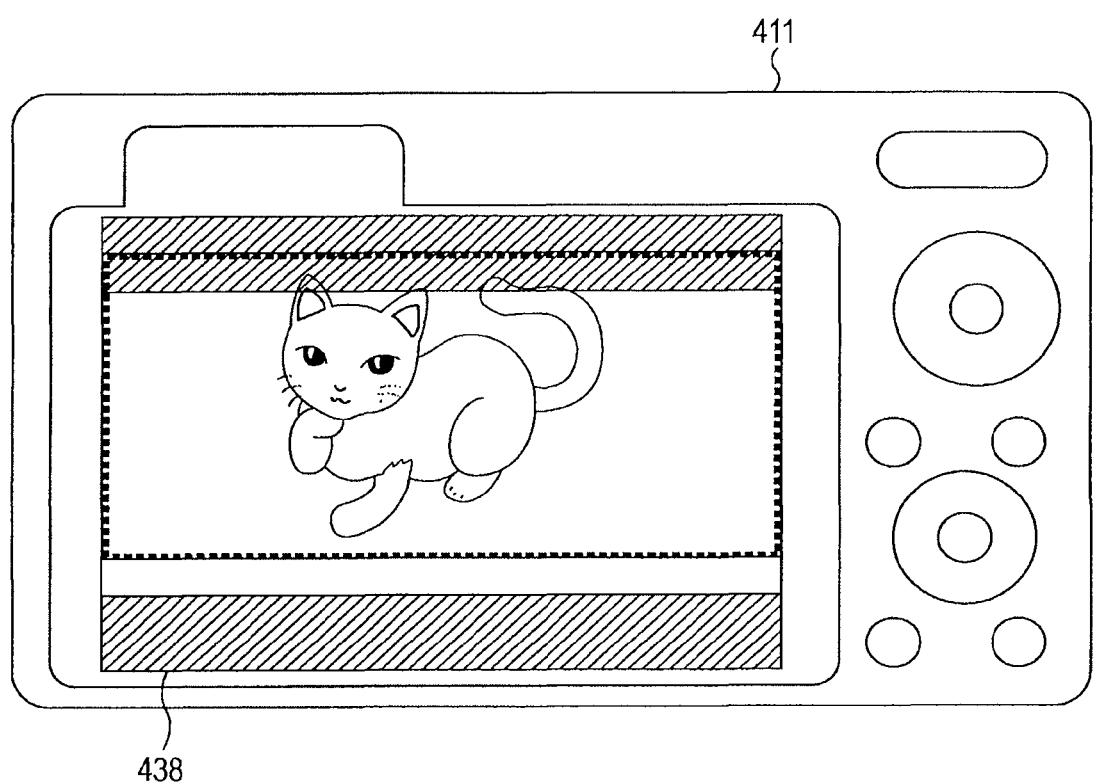
FIG. 32 is a diagram describing an example of a synthesized image displayed on the display unit.

FIG. 32 shows an example of a synthesized image displayed on the display unit 438.

In FIG. 32, the display region of the display unit 438 of the digital camera 411 has an aspect ratio of 4:3. In panorama mode, the display control unit 437 displays a black image (so-called black band) in the region of the upper side and the region of the lower side of the display region of the display unit 438, thereby forming a display region having an aspect ratio of 16:9.

As shown in FIG. 32, the display control unit 437 displays the portions corresponding to the cropped image of the synthesized image on the display region having an aspect ratio of 16:9 of the display unit 438. Also, the display control unit 437 displays a frame shown with a broken line in the diagram, so as to enhance the portion corresponding to the extracted image in the synthesized image on the display unit 438. At this time, the portion of the portions corresponding to the extracted image in the synthesized image which falls in the black band (upper side) of the display region of the display unit 438 is displayed as a synthesized image having low brightness. Note that the extracted image displayed on the display unit 438 can be displayed so as to be enhanced with a frame as in FIG. 32, and so that the user can confirm the display range of the extracted image.

According to the above processing, the image of the composition that the user is attempting to photograph in panorama mode of a digital camera having only one imaging system and an image of a composition wherein a subject with a high degree of focus is positioned in the center thereof can be displayed together, whereby the user can confirm a composition more appropriate than a composition that the user is attempting to photograph (record).

Note that with the above-described processing, the cropped image and extracted image are displayed together on the display unit 438, but the imaging image and extracted image can be displayed together and the brightness lowered in the portion falling in the black band of the display region of the display unit 438.

In the above, a processing to display together an image of a composition that the user is attempting to photograph in panorama mode and an image of a composition wherein the subject having a high degree of focus is positioned in the center thereof has been described, but an image of a composition that the user is attempting to photograph in panorama mode and an image of a composition wherein the subject having a high degree of focus is positioned in the center can also be recorded.

[Image Recording Processing of Digital Camera]

Now, the image recording processing of the digital camera 411 in FIG. 28 will be described with reference to the flowchart in FIG. 33. Note that the image recording processing in FIG. 33 is started in the case that the operating input unit 439 receives from the user an operation indicating that the panorama mode is selected as the imaging mode.

Figure 33:
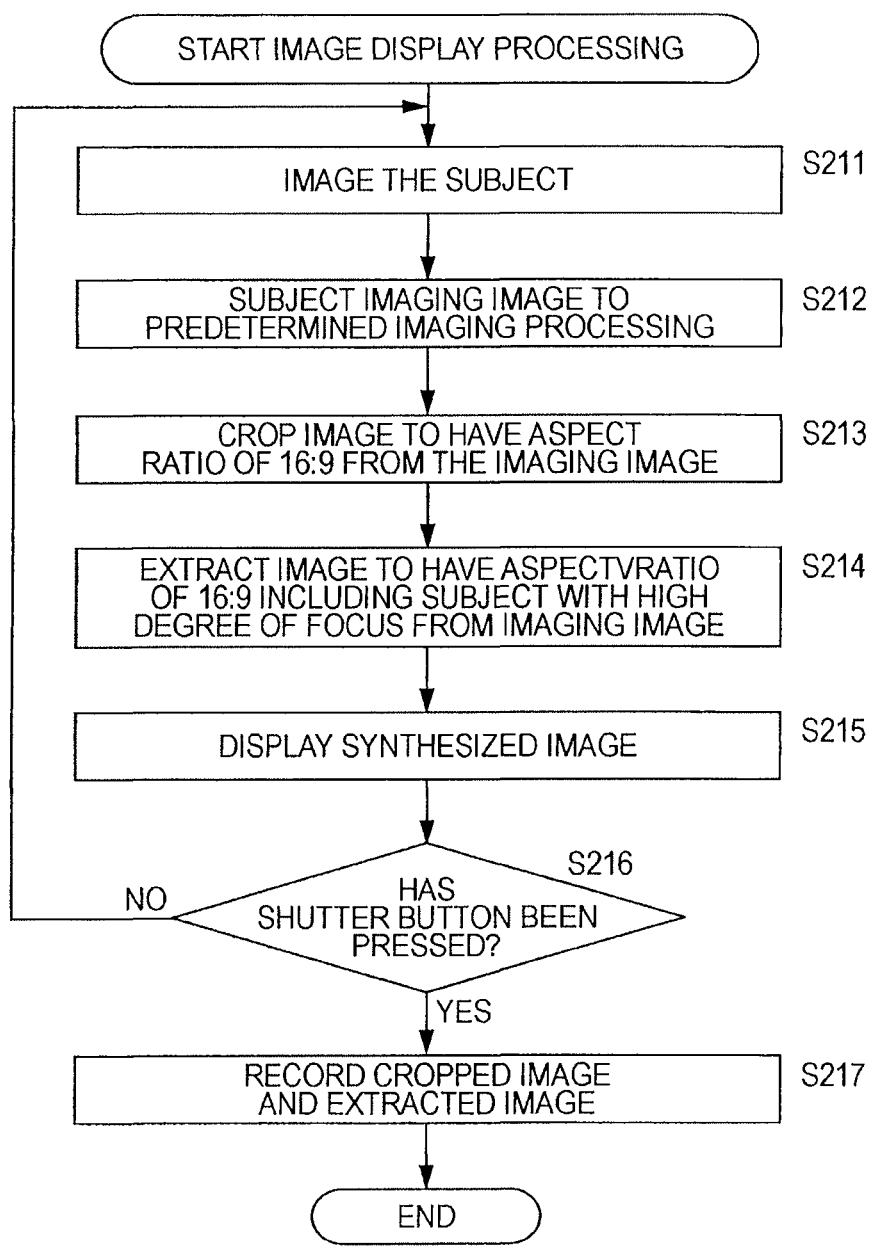
FIG. 33 is a flowchart describing the image recording processing of the digital camera in FIG. 28.

Note that the processing in steps S211 through S214 in the flowchart in FIG. 33 is basically the same as the processing in steps S111 through S114 in the flowchart in FIG. 29, except for the point that in step S213, the cropped image is supplied to the display control unit 437 and recording control unit 440 and the point that in step S214 the extracted image is supplied to the recording control unit 440, so the descriptions thereof will be omitted.

In step S215, the display control unit 437 displays the cropped image supplied from the cropping unit 434 on the display unit 438. More specifically, the display control unit 437 displays the cropped image on the display region having an aspect ratio 16:9 of the display unit 438, as shown in FIG.

32. At this time, in a display region of the display unit 438, a black band is displayed in the region of the upper side and the region of the lower side.

In step S216, the recording control unit 440 determines whether or not the shutter button serving as the operating input unit 439 has been pressed.

In the case determination is made in step S216 that the shutter button has not been pressed, the processing returns to step S211, and the processing hereafter is repeated.

On the other hand, in the case determination is made in step S216 that the shutter button has been pressed, i.e. in the case the signal from the operating input unit 440 indicating that the shutter button has been pressed is supplied to the recording control unit 440, the processing is advanced to step S217.

In step S217, the recording control unit 440 records the cropped image from the cropping unit 434 and the extracted image from the extracting unit 435, based on the signals from the operating input unit 440 in the recording unit 441. For example, the cropped image 512 described with FIG. 30 and the extracted image 513 described with FIG. 31 are recorded in the recording unit 441.

With a conventional digital camera, in the case that an image such as the cropped image 512 described in FIG. 30 is an image of a composition that the user unfamiliar with photography attempts to photograph in panorama mode, the image to be recorded also becomes an image such as shown in the cropped image 512 described with FIG. 30. In this case, a portion of the subject not included in the recoded image (portion that is missing), cannot be generated and an image having a better composition obtained.

According to the above processing, the cropped image and extracted image can be recorded in panorama mode, so an image with a composition that a user not accustomed to photography has photographed and an image of composition more appropriate to the user than the photographed composition can be recorded.

Also, the image of the composition that the user has photographed and the image of a composition more appropriate than the composition photographed by the user are recorded, whereby the user can compare the two images, and this can be helpful to the user in improving photography techniques.

In the above-described processing, each of the cropped image and extracted image are recorded in the recording unit 441, but a synthesized image wherein the cropped image and extracted image described with the flowchart in FIG. 29 are synthesized can be recorded in the recording unit 441.

Figure 34:
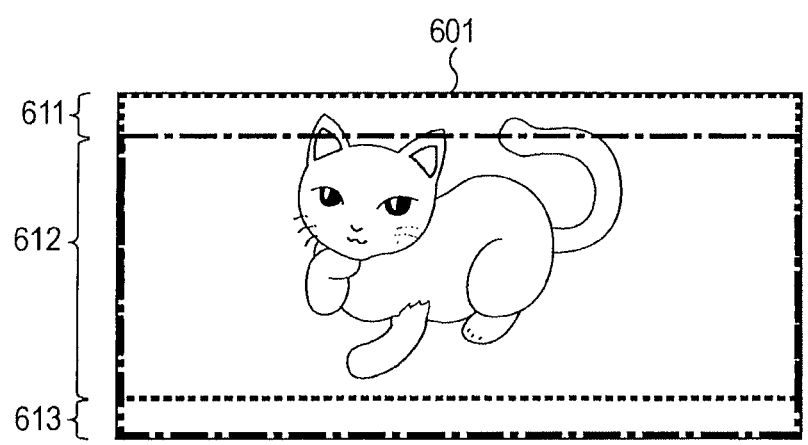
FIG. 34 is a diagram describing an example of a synthesized image recorded on the recording unit.
Figure 35:
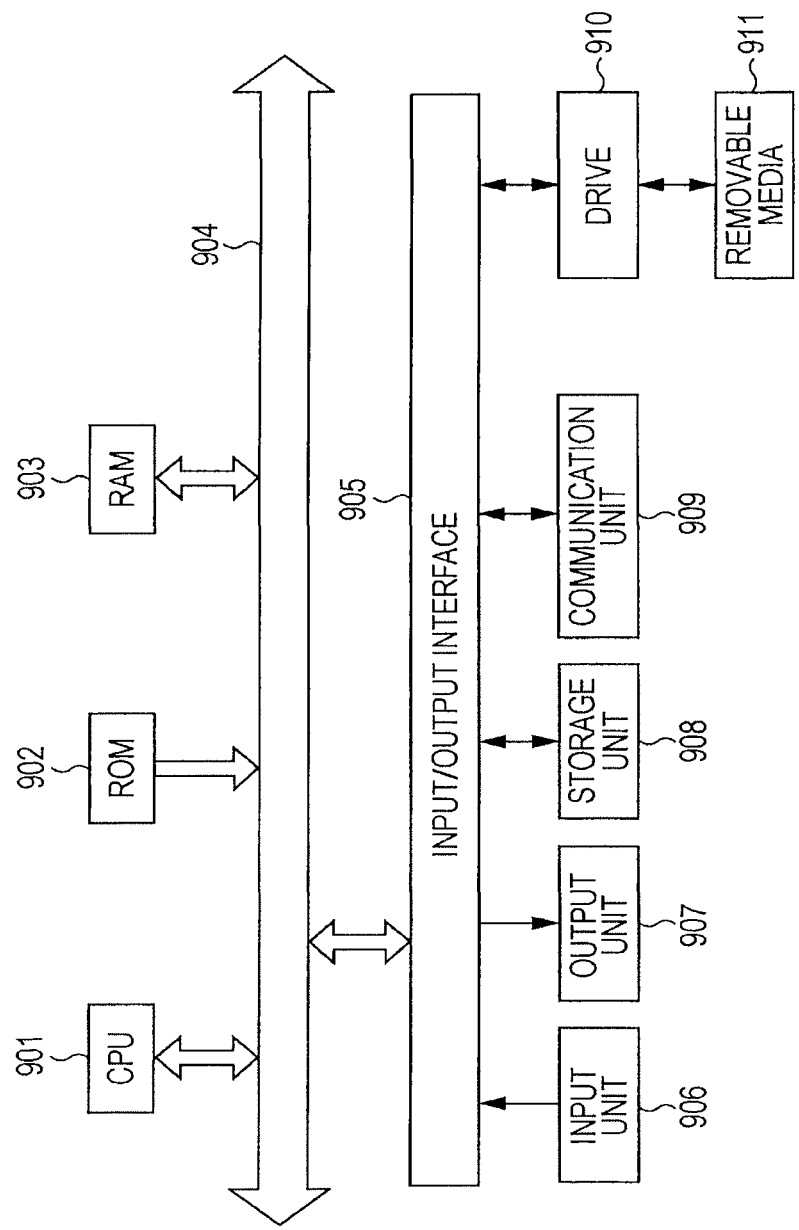
FIG. 35 is a block diagram showing a configuration example of computer hardware.

FIG. 34 shows an example of the synthesized image recorded in the recording unit 441.

In the synthesized image 601 in FIG. 34, the portion shown with a dotted-broken line corresponds to the cropped image, and the portion shown with a broken line corresponds to the extracted image. Now, we can consider the synthesized image 601 as divided into three regions 611 through 613. At this time, the region 611 is a portion that does not exist in the cropped image but exists in the extracted image, the region 612 is a portion that exists in both the cropped image and extracted image, and the region 613 is a portion that exists in the cropped image but not in the extracted image.

In the case that signals indicating instructions to play (display) the cropped image are supplied from the operating input unit 439 by user operations, the recording control unit 440 reads out the regions 612 and 613 in the synthesized image 601 and supplies these to the display control unit 437. Also, in the case that signal indicating instructions to play the extracted image are supplied from the operating input unit 439 due to user operations, the recording control unit 440 reads out the regions 611 and 612 in the synthesized image 601 and supplies these to the display control unit 437.

Thus, in the case of considering playing (displaying) each of the cropped image and extracted image, even if each of the cropped image and extracted image are not recorded in the recording unit 441, only one synthesized image has to be recorded, whereby the amount recorded in the recording unit 441 can be reduced.

Note that in the case that the synthesized image 601 is not generated, the image corresponding to the region 611 and the cropped image can be recorded together, and the image corresponding to the region 613 and the extracted image can be recorded together.

Also, with the above-described processing, upon the shutter button serving as the operating input unit 439 having been operated, the extracted image is recorded, but for example the extracted image can be recorded when composition of the extracted image matches a composition pattern prepared beforehand such as a tri-partition composition, horizontal line composition, or radiating line composition.

Thus, even if the user does not operate the shutter button, an image of a better composition can be recorded.

Further, with the above-described processing, the image processing unit 433 performs predetermined image processing as to the image data obtained from all of the imaging devices of the imaging unit 432, but the image processing may be performed as to the image data obtained from the imaging device corresponding to the region 313 of the imaging device 301 in FIG. 27 until the shutter button serving as the operating input unit 439 is operated, and upon the shutter button having been operated, the image processing may be performed as to the image data obtained from all of the imaging devices.

Thus, the processing load of the image processing unit 433 until the shutter button is operated can be reduced.

The above-described series of processing can be executed with hardware, or can be executed with software. In the case of executing the series of processing with software, a program making up the software is installed from a program recording medium into a computer with dedicated hardware built in, or into a general-use personal computer or the like that can execute various types of functions by installing various types of programs, for example.

FIG. xx is a block diagram showing a configuration example of the computer hardware that executes the above-described series of processing with a program.

In the computer, a CPU (Central Processing Unit) 901, ROM (Read Only Memory) 902, RAM (Random Access Memory) 903 are mutually connected by a bus 904.

The bus 904 further has an input/output interface 905 connected thereto. The input/output interface 905 has an input unit 906 made up of a keyboard, mouse, microphone or the like, an output unit 907 made up of a display, a speaker, or the like, a storage unit 908 made up of a hard disk or non-volatile memory or the like, a communication unit 909 made up of a network interface or the like, and a drive 910 to drive removable media 911 such as a magnetic disk, optical disk, magneto-optical disk, or semiconductor memory or the like, connected thereto.

With the computer configured as above, for example the CPU 901 loads in the RAM 903 and executes the program stored in the storage unit 908 via the input/output interface 905 and bus 904, whereby the above-described series of processing is performed.

The program that the computer (CPU 901) executes is recorded on a removable media 911 which is package media made up of, for example, magnetic disk (includes flexible disk), optical disk (CD-ROM (Compact Disc-Read Only Memory), DVD (Digital Versatile Disc) and the like), magneto-optical disk, semiconductor memory, or the like, or alternatively is provided via a cabled or wireless transmitting medium such as a local area network, Internet, or digital satellite broadcasting.

The program can be installed in the storage unit 908 via the input/output interface 905 by the removable media 911 being mounted on the drive 910. Also, the program can be installed on the storage unit 908 by being received with the communication unit 909, via the cabled or wireless transmitting medium. Alternatively, the program can be installed beforehand in the ROM 902 or storage unit 908.

Note that the program that the computer executes may be a program wherein processing is performed in a time-series manner along the sequence described in the present Specification, or may be a program where processing is executed in parallel or at a necessary timing such as upon being called up or the like.

Also, embodiments of the present embodiment are not to be limited to the above-described embodiments, and various modifications can be made without departing from the essence of the present invention.

Explanation of Reference Numerals

11 digital camera, 31 main lens, 32 sub-lens, 51 imaging unit, 52 distortion correcting unit, 53 optical axis correcting unit, 54 image processing unit, 55 imaging unit, 56 image processing unit, 57 synthesizing unit, 58 display unit, 121 digital camera, 151 object detecting unit, 152 image processing unit, 153 synthesizing unit, 221 digital camera, 251 composition analyzing unit, 252 recommended composition extracting unit, 253 image processing unit, 254 synthesizing unit

The invention claimed is:

1. An imaging apparatus comprising:
   imaging means to image a first image including a predetermined subject;
   detecting means to detect, from said first image, a second image including said subject, which is an image differing in size from said first image;
   synthesizing means to synthesize said second image detected by said detecting means to said first image, so that the position of said subject matches;
   display means to display, in a predetermined region of said second image capable of displaying the entirety of said first image, a corresponding portion of said first image, and to display said second image with which said first image has been synthesized;
   cropping means to crop said first image of said predetermined region;
   recording means to record said first image that has been cropped by said cropping means and said second image that has been detected by said detecting means;
   composition analysis means to analyze the composition of said second image; and
   composition extracting means to extract the composition of a view angle different from the view angle of said first image, from said second image, based on the composition analyzed by said composition analysis means;
   wherein said synthesizing means synthesizes said first image and the extracted image of the composition extracted by said composition extracting means, to said second image, with the position of said subject as a reference.

2. The imaging apparatus according to claim 1, wherein said display means display said second image in an enhanced manner.

3. The imaging apparatus according to claim 1, wherein said display region is a region wherein said first image is displayed in its entirety when in a mode that images an image having an aspect ratio of 4:3;
   and wherein said predetermined region in said display region is a region wherein a portion of said first image is the display region when in a mode that images an image having an aspect ratio of 16:9.

4. The imaging apparatus according to claim 1, wherein said synthesizing means synthesizes said first image that has been cropped by said cropping means and said second image that has been detected by said detecting means, and wherein
   said recording means record said first image and said second image that have been synthesized by said synthesizing means.

5. An imaging method comprising:
   an imaging step to image a first image including a predetermined subject;
   a detecting step to detect, from said first image, a second image including said subject, which is an image differing in size from said first image;
   a synthesizing step to synthesize said second image detected by the processing in said detecting step to said first image, so that the position of said subject matches;
   a displaying step to display, in a predetermined region of said second image capable of displaying the entirety of said first image, a corresponding portion of said first image, and to display said second image with which said first image has been synthesized;
   a cropping step to crop said first image of said predetermined region;
   a recording step to record said first image that has been cropped by said cropping means and said second image that has been detected by said detecting means;
   a composition analysis step to analyze the composition of said second image; and
   a composition extracting step to extract the composition of a view angle different from the view angle of said first image, from said second image, based on the composition analyzed by said composition analysis step;
   wherein said synthesizing step comprises synthesizing said first image and the extracted image of the composition extracted by said composition extracting step, to said second image, with the position of said subject as a reference.

6. A non-transitory computer-readable medium comprising instructions that cause a computer to perform processing including:
   an imaging control step to control imaging of a first image including a predetermined subject;
   a detecting step to detect, from said first image, a second image including said subject, which is an image differing in size from said first image;
   a synthesizing step to synthesize said second image detected by the processing in said detecting step to said first image, so that the position of said subject matches;
   a display control step to display, in a predetermined region of said second image capable of displaying the entirety of said first image, a corresponding portion of said first image, and to display said second image with which said first image has been synthesized;
   a cropping step to crop said first image of said predetermined region; and
   a recording step to record said first image that has been cropped by said cropping means and said second image that has been detected by said detecting means;

a composition analysis step to analyze the composition of said second image; and a composition extracting step to extract the composition of a view angle different from the view angle of said first image, from said second image, based on the composition analyzed by said composition analysis step;

wherein said synthesizing step comprises synthesizing said first image and the extracted image of the composition extracted by said composition extracting step, to said second image, with the position of said subject as a reference.

7. An imaging apparatus comprising:

first imaging means to image a first image including a predetermined subject;

second imaging means to image a second image including said predetermined subject, which is an image differing in view angle from said first image;

first image quality adjusting means to adjust the image quality of said second image so as to differ from the image quality of said first image;

synthesizing means to synthesize said first image to said second image of which the image quality has been adjusted by said first image quality adjusting means, with the position of said subject as a reference;

cropping means to crop said first image of said predetermined region; and recording means to record said first image that has been cropped by said cropping means and said second image that has been detected by said detecting means;

composition analysis means to analyze the composition of said second image; and composition extracting means to extract the composition of a view angle different from the view angle of said first image, from said second image, based on the composition analyzed by said composition analysis means;

wherein said synthesizing means synthesizes said first image and the extracted image of the composition extracted by said composition extracting means, to said second image, with the position of said subject as a reference.

8. The imaging apparatus according to claim 7, further comprising display means to display an image synthesized by said synthesizing means.

9. The imaging apparatus according to claim 7, further comprising:

object detecting means to detect an object within said second image; and second image quality adjusting means to adjust the image quality of a region of said object within said second image that has been detected by said object detecting means so as to differ from the image quality of said second image;

wherein said synthesizing means synthesize, to said second image, said first image and the object image in the region of said object within said second image of which the image quality has been adjusted by said second image quality adjusting means, with the position of said subject match as a reference.

10. The imaging apparatus according to claim 9, wherein said object detecting means detect said object having motion within said second image.

11. The imaging apparatus according to claim 9, wherein said object detecting means detect the face of a person within said second image.

12. The imaging apparatus according to claim 7, wherein said second imaging means image said second image having a wider view angle than said first image.

13. The imaging apparatus according to claim 7, further comprising:

distortion correcting means to correct distortion of said second image; and optical axis correcting means to match the optical axis of said second optical system to the optical axis of said first optical system, and determine the position of said first image synthesized to said second image.

14. The imaging apparatus according to claim 7, wherein said first image quality adjusting means adjust the level of the color signal of said second image so as to be lower than the level of the color signal of said first image.

15. The imaging apparatus according to claim 14, wherein said first image quality adjusting means adjust the level of the color signal of said second image so as to be lower than the level of the color signal of said first image.

16. An imaging method comprising:

a first imaging step to image a first image including a predetermined subject;

a second imaging control step to image a second image including said predetermined subject, which is an image differing in view angle from said first image;

an image quality adjusting step to adjust the image quality of said second image so as to differ from the image quality of said first image;

a synthesizing step to synthesize said first image to said second image of which the image quality has been adjusted by the processing in said first image quality adjusting step, with the position of said subject as a reference;

a cropping step to crop said first image of said predetermined region; and a recording step to record said first image that has been cropped by said cropping means and said second image that has been detected by said detecting means;

composition analysis means to analyze the composition of said second image; and composition extracting means to extract the composition of a view angle different from the view angle of said first image, from said second image, based on the composition analyzed by said composition analysis means;

wherein said synthesizing means synthesizes said first image and the extracted image of the composition extracted by said composition extracting means, to said second image, with the position of said subiect as a reference.

17. A non-transitory computer-readable medium comprising instructions that cause a computer to perform processing including:

a first imaging control step to control imaging of a first image including a predetermined subject;

a second imaging control step to control imaging of a second image including said predetermined subject, which is an image differing in view angle from said first image;

an image quality adjusting step to adjust the image quality of said second image so as to differ from the image quality of said first image;

a synthesizing step to synthesize said first image to said second image of which the image quality has been adjusted by the processing in said first image quality adjusting step, with the position of said subject as a reference;

a cropping step to crop said first image of said predetermined region; and a recording step to record said first image that has been cropped by said cropping means and said second image that has been detected by said detecting means;

a composition analysis step to analyze the composition of said second image; and a composition extracting step to extract the composition of a view angle different from the view angle of said first image, from said second image, based on the composition analyzed by said composition analysis step;

wherein said synthesizing step comprises synthesizing said first image and the extracted image of the composition extracted by said composition extracting step, to said second image, with the position of said subject as a reference.

* * * * *